(12) United States Patent
Kasahara et al.

(10) Patent No.: US 11,354,601 B2
(45) Date of Patent: Jun. 7, 2022

(54) LEARNING CLASSIFICATION DEVICE AND LEARNING CLASSIFICATION METHOD

(71) Applicant: Ricoh Company, Ltd., Tokyo (JP)

(72) Inventors: Ryosuke Kasahara, Kanagawa (JP); Takuya Tanaka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 714 days.

(21) Appl. No.: 16/294,963

(22) Filed: Mar. 7, 2019

(65) Prior Publication Data

US 2019/0287023 A1    Sep. 19, 2019

(30) Foreign Application Priority Data

Mar. 16, 2018  (JP) .............................. JP2018-050250
Mar. 16, 2018  (JP) .............................. JP2018-050252
Mar. 16, 2018  (JP) .............................. JP2018-050254

(51) Int. Cl.
*G06N 20/20*     (2019.01)
*G06N 5/04*      (2006.01)
*G06F 12/02*     (2006.01)
*G06N 5/00*      (2006.01)
*G06F 12/06*     (2006.01)

(52) U.S. Cl.
CPC ......... *G06N 20/20* (2019.01); *G06F 12/0223* (2013.01); *G06F 12/0607* (2013.01); *G06N 5/003* (2013.01); *G06N 5/045* (2013.01)

(58) Field of Classification Search
None
See application file for complete search history.

(56) References Cited

U.S. PATENT DOCUMENTS

| | | |
|---|---|---|
| 2011/0178976 A1 | 7/2011 | Nishiyama |
| 2014/0285426 A1 | 9/2014 | Minagawa et al. |
| 2015/0125072 A1 | 5/2015 | Mitarai et al. |
| 2016/0162793 A1 | 6/2016 | Wang et al. |
| 2016/0225119 A1 | 8/2016 | Xu et al. |

(Continued)

FOREIGN PATENT DOCUMENTS

| | | |
|---|---|---|
| JP | H09-232967 | 9/1997 |
| JP | 2006-91937 A | 4/2006 |
| JP | 2010-044674 | 2/2010 |

(Continued)

OTHER PUBLICATIONS

Shi et al., Gradient Boosting With Piece-Wise Linear Regression Trees, arXiv:1802.05640v1 [cs.LG] Feb. 15, 2018 (Year: 2018).*

(Continued)

*Primary Examiner* — Alan Chen
(74) *Attorney, Agent, or Firm* — Xsensus LLP

(57) ABSTRACT

A learning classification device includes a data memory, a learning unit, and a classification unit. The data memory is configured to store training data for learning a decision tree. The learning unit is configured to read a plurality of feature quantities included in the training data from the data memory by single access and derive data of a node based on the plurality of feature quantities, to learn the decision tree. The classification unit is configured to determine where the training data read from the data memory is to be split to from the node, based on the data of the node derived by the learning unit.

16 Claims, 13 Drawing Sheets

(56) References Cited

U.S. PATENT DOCUMENTS

2017/0323638 A1* 11/2017 Malinowski ............ G10L 15/22

FOREIGN PATENT DOCUMENTS

| JP | 5032602 | 7/2012 |
|---|---|---|
| JP | 2014-182748 | 9/2014 |
| JP | 2014-241060 | 12/2014 |
| JP | 2015-076054 | 4/2015 |
| JP | 2015-090559 | 5/2015 |
| WO | WO 2016/090290 A1 | 6/2016 |

OTHER PUBLICATIONS

Ke et al., LightGBM: A Highly Efficient Gradient Boosting Decision Tree, 31st Conference on Neural Information Processing Systems (NIPS 2017), Long Beach, CA, USA. (Year: 2017).*

Chandra et al., A new node splitting measure for decision tree construction, Pattern Recognition 43 (2010), pp. 2725-2731 (Year: 2010).*

Office Action dated Jul. 1, 2021 in European Patent Application No. 19 162 068.1, 8 pages.

Anonymous: "Direct memory access—Wikipedia", Feb. 28, 2018, XP055817500, Retrieved from the Internet: URL: https://en.wikipedia.org/w/index.php?title=Direct_memory_access&oldid=828116596#ISA [retrieved on Jun. 24, 2021], 8 pages.

Extended European Search Report dated Jul. 24, 2019 in Patent Application No. 19162068.1, 9 pages Meng, Q. et al. "A Communication-Efficient Parallel Algorithm for Decision Tree" Cornell University Library, XP080729340, 2016, 14 pages.

Keck, T. "FastBDT: A speed-optimized and cache-friendly implementation of stochastic gradient-boosted decision trees for multivariate classification" Cornell University Library, XP080728108, 16 pages.

Office Action dated Feb. 1, 2022 in Japanese Patent Application No. 2018-050250, 3 pages.

* cited by examiner

LEARNING CLASSIFICATION DEVICE AND LEARNING CLASSIFICATION METHOD

CROSS-REFERENCE TO RELATED APPLICATIONS

The present application claims priority under 35 U.S.C. § 119 to Japanese Patent Applications No. 2018-050250, No. 2018-050252 and No. 2018-050254, filed on Mar. 16, 2018. The contents of which are incorporated herein by reference in their entirety.

BACKGROUND OF THE INVENTION

1. Field of the Invention

The present invention relates to a learning classification device and a learning classification method.

2. Description of the Related Art

Attempts have been made in various fields to replace human functions based on huge volume of data using machine learning which has come to be commonly known in relation to artificial intelligence (AI). This field is developing day by day but yet has some problems in the present situation. Typical problems are the limit in accuracy including generalization performance for extracting general knowledge from data and the limit in processing speed due to large computational cost. Deep learning (DL), especially convolutional neural network (CNN), in which an input vector is limited to the neighborhood, is well-known algorithm for high-performance machine learning. Compared with those techniques, in the present situation, gradient boosting decision tree (GBDT) is known to be less accurate for input data such as images, sounds, and languages because extraction of feature quantities is difficult, but GBDT offers better performance for other structured data. In Kaggle which is the competition of data scientists, GBDT is the most standard algorithm. It is said that 70% of problems to be solved by machine learning in the real world is structured data other than images, sounds, and languages, and GBDT is undoubtedly an important algorithm to solve problems in the real world. Techniques for feature extraction from data such as images and sounds using decision trees have recently been proposed.

As a technique for implementing a fast classification process using such decision trees, a technique is disclosed that enhances the efficient use of a cache memory to speed up a classification process by appropriately adjusting thresholds in exploring node data in decision trees (see Japanese Patent No. 5032602).

Unfortunately, the technique disclosed in Japanese Patent No. 5032602 merely makes efficient use of a cache memory and fails to learn a decision tree at high speed because there is a limit in improvement in processing speed. Moreover, according to this technique, one piece of sample data is stored across addresses different for each feature quantity. If there are many feature quantities, all the feature quantities are unable to be read by single access. Therefore, this technique fails to speed up a learning process.

SUMMARY OF THE INVENTION

According to one aspect of the present invention, a learning classification device includes a data memory, a learning unit, and a classification unit. The data memory is configured to store training data for learning a decision tree. The learning unit is configured to read a plurality of feature quantities included in the training data from the data memory by single access and derive data of a node based on the plurality of feature quantities, to learn the decision tree. The classification unit is configured to determine where the training data read from the data memory is to be split to from the node, based on the data of the node derived by the learning unit.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
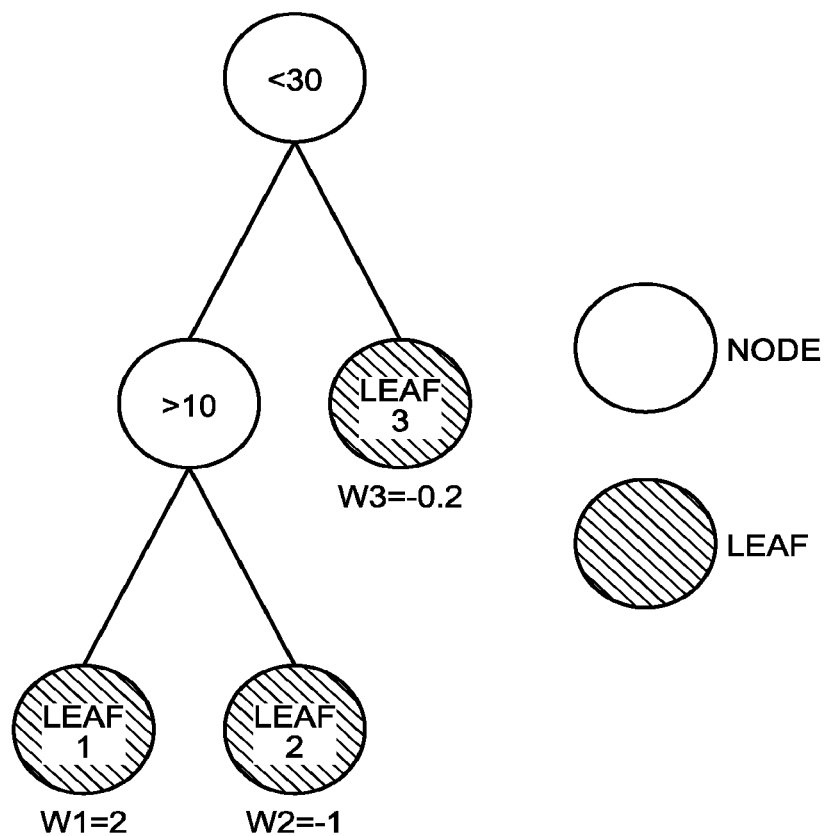
FIG. 1 is a diagram illustrating an exemplary decision tree model.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a learning classification device and a learning classification method capable of increasing the learning speed of decision trees.

Embodiments of a learning classification device and a learning classification method according to the present invention will be described in detail below with reference to FIG. 1 to FIG. 15. The present invention is not limited by the following embodiments, and the components in the following embodiments include those easily conceived by a person skilled in the art, those substantially identical, and equivalents thereof. The components may be eliminated, replaced, modified, and combined without departing from the spirit of the following embodiments.

Logic of GBDT

In DL as a high-performance machine learning algorithm, classifiers are implemented by various hardware logic, which is known to be power efficient compared with the processing by a graphics processing unit (GPU). In DL, especially in the case of CNN, which is well matched with GPU architectures, a field-programmable gate array (FPGA) with logic implementation is not necessarily faster in classification than GPUs. By contrast, for decision tree-type algorithms such as GBDT, hard logic implementation on FPGA has been attempted and is reportedly faster than GPUs. As will be described later, this is because decision tree-based algorithms are not suited for GPU architectures because of their characteristics of data alignment.

The study on learning lags behind classification in the world. Learning in DL is scarcely reported, and there are few reports on decision tree learning. Among those, GBDT learning has not yet been reported at present and is considered to be an unexplored field. In order to obtain an accurate classification model, selection and designing of feature quantities as well as selection of hyperparameters in a learning algorithm are performed during learning. This requires a massive number of trials, and in particular, when there is a large amount of training data, the speed of learning process actually has a large impact on the accuracy of a final model. In the fields that require real-time adaptation to environment changes, such as robotics, high frequency trading (HFT), and real-time bidding (RTB), speed is directly connected with performance. Thus, a high-speed learning process in accurate GBDT is likely to result in much better performance of a system using GBDT.

Compatibility of GBDT to FPGAs

We will discuss why decision trees or GBDT is not speeded up by GPUs and why speeded up by FPGAs, in terms of compatibility of GBDT to FPGAs.

First of all, we will focus on that GBDT is an algorithm using boosting. Among decision trees, random forest (RF) using ensemble learning is easily parallelized with a GPU because there is no dependency between trees. However, GBDT is a method of connecting many trees using boosting, where learning of a next tree is not started without an outcome of the preceding tree. Therefore, the processing is serial and how fast each individual tree is learned is the key. By contrast, in RF, although learning per tree is slow, the learning as a whole can be speeded up by accelerating learning of many tress in parallel. For this reason, the use of GPUs may conceal the problem of access latency of a dynamic random access memory (DRAM) to some extent, which will be described next.

We will now focus on the limit in access speed (especially, random access) to a random access memory (RAM) in a GPU device. A static random access memory (SRAM) in a FPGA can increase the bus width of RAM in FPGA. Therefore, when a middle-range FPGA, for example, XC7k325T available from Xilinx Inc. is used, 3.2 [TB/sec] is achieved as illustrated below. Here, the capacity of the internal RAM is 16 [Mb].

445 BRAMs×36 bits×100 MHz×2 ports=445*36*2*100*10^6/10^12/8=400 GB/sec

In the case of a high end FPGA, VU9P available from Xilinx Inc., 864 [GB/sec] is achieved. The capacity of the internal RAM is 270 [Mb].

960 URAMs×36 bits×100 MHz×2 ports=960*36*2*100*10^6/10^12/8=864 GB/sec

These values are obtained when the clock frequency is 100 [MHz]. In actuality, with design of a circuit configuration, the operation at about 200 to 500 [MHz] is possible, achieving a several-fold higher limit bandwidth. By contrast, a RAM connected to a central processing unit (CPU) in the current generation is Double-Data-Rate4 (DDR4), and the bandwidth per dual inline memory module (DIMM) is only 25.6 [GB/sec]. A four-DIMM interleave configuration (256-bit width) attains about 100 [GB/sec]. When the DDR4 chip standard is DDR4-3200 (bus width 64 bits, one DIMM), we can obtain as follows.

200 MHz×2(DDR)×64=200*10^6*2*64/10^9=25.6 GB/sec

Graphics Double-Data-Rate5 (GDDR5) on a GPU has a bandwidth about four times as large as the bandwidth of DDR4, but yet about 400 [GB/sec] at maximum.

In this way, there is a large difference in bandwidth between a RAM in FPGA and an external memory in GPU and CPU. Although we have discussed the case of sequential access to addresses, the access time in random access has a more significant impact. The internal RAM in FPGA is an SRAM, with an access latency of one clock either in sequential access or in random access. DDR4 and GDDR5 are DRAMs and have a larger latency when different columns are accessed, for the sake of sense amplifiers. For example, in a RAM of DDR4, a typical column address strobe latency (CAS latency) is 16 clocks and, to put it simply, the throughput is only 1/16 of sequential access.

In the case of CNN, in which data of neighboring pixels are processed, the latency in random access is not a major problem. However, in the case of decision trees, as splitting proceeds, the address of original data becomes more and more discontinuous for each branch, basically involving random access. Therefore, when data is written in a DRAM, its throughput is a bottleneck to cause a significant slowdown. In order to prevent performance degradation in such a case, GPUs include caches. However, since a decision tree is basically an algorithm that sweeps data, there is no locality in data access, and the cache is unlikely to be effective. In the GPU structure, a GPU has a shared memory configured with an SRAM allocated to each core (SM). The use of a shared memory may achieve fast processing, but as small as 16 to 48 [kB] per SM, and the access across SMs has a large latency. The capacity of a shared memory in the case of Nvidia K80, which is an expensive and large-scale GPU at present, is as below.

K80=2×13 SMX=26 SMX=4992 CUDA cores
26×48×8=9 Mb

In this way, even a large-scale GPU which costs several hundred thousand yen has a shared memory of only 9 [Mb], which is too small capacity. Moreover, since the SM that performs processing is unable to directly access the shared memory of another SM, fast coding is difficult when GPUs are used for decision tree learning.

As described above, on the precondition that data is to be written in an SRAM on FPGA, FPGA can implement a GBDT learning algorithm faster than GPUs.

GBDT Algorithm

FIG. 1 is a diagram illustrating an exemplary decision tree model. In the following, referring to Eq. (1) to Eq. (22) and FIG. 1, the basic logic of GBDT is described.

GBDT is one of methods of supervised learning. As represented by Eq. (1), supervised learning is a process of optimizing an objective function obj(θ) including a loss function L(θ) representing goodness of fitting to training data and a regularization term Ω(θ) representing the complexity of the learned model. The regularization term Ω(θ) has the role of preventing a model (decision tree) from becoming too complicated, that is, increasing generalization performance.

$$\mathrm{obj}(\theta) = L(\theta) + \Omega(\theta) \tag{1}$$

The loss function in the first term in Eq. (1), for example, adds up losses calculated by an error function l for each sample data (training data), as represented by Eq. (2) below. Here, n is a sample size, i is a sample number, y is a label, and y (hat) of the model is a predictive value.

$$L(\theta) = \sum_{i=1}^{n} l(y_i, \hat{y}_i) \tag{2}$$

Here, the error function l used is, for example, a square error function or a logistic loss function as represented by Eq. (3) and Eq. (4) below.

$$l(y_i, \hat{y}_i) = (y_i - \hat{y}_i)^2 \tag{3}$$

$$l(y_i, \hat{y}_i) = y_i \ln(1 + e^{\hat{y}_i}) + (1 - y_i)\ln(1 + e^{\hat{y}_i}) \tag{4}$$

The regularization term Ω(θ) in the second term in Eq. (1) used is, for example, the square norm of a parameter θ as represented by Eq. (5) below. Here, λ is a hyperparameter representing the weight of regularization.

$$\Omega(\theta) = \lambda \|\theta\|^2 \tag{5}$$

We will now examine the case of GBDT. First of all, the predictive value for the i-th sample data $x_i$ in GBDT can be written as Eq. (6) below.

$$\hat{y}_i = \sum_{k=1}^{K} f_k(x_i) \tag{6}$$

Here, K is the total number of decision trees, k is the number of a decision tree, $f_k(\ )$ is the output of the k-th decision tree, $x_i$ is the feature quantity of input sample data. It can be understood that GBDT yields a final output that is the sum of outputs of decision trees, in the same manner as in RF. The parameter θ is θ={$f_1, f_2, \ldots, f_k$}. Based on the above, the objective function of GBDT can be written as Eq. (7) below.

$$\mathrm{obj}(\theta) = \sum_{i=1}^{n} l(y_i, \hat{y}_i) + \sum_{k=1}^{K} \Omega(f_k) \tag{7}$$

In learning of the objective function above, such a method as stochastic gradient descent (SGD) used in learning in neural networks cannot be used in decision tree models. Then, Additive Training (boosting) is used for learning. In Additive Training, the predictive value in a certain round (learning iteration, decision tree model number) t is written as Eq. (8) below.

$$\hat{y}_i^{(0)} = 0 \tag{8}$$

$$\hat{y}_i^{(1)} = f_1(x_i) = \hat{y}_i^{(0)} + f_1(x_i)$$

$$\hat{y}_i^{(2)} = f_1(x_i) + f_2(x_i) = \hat{y}_i^{(1)} = +f_2(x_i)$$

$$\hat{y}_i^{(t)} = \sum_{k=1}^{t} f_k(x_i) = \hat{y}_i^{(t-1)} + f_t(x_i)$$

Eq. (8) indicates that it is necessary to find (output of) a decision tree $f_t(x_i)$ in a certain round t. Conversely, in a certain round t, other rounds need not be examined. We then examine a round t below. The objective function in a round t is written as Eq. (9) below.

$$\mathrm{obj}^{(t)} = \sum_{i=1}^{n} l(y_i, \hat{y}_i^{(t)}) + \sum_{k=1}^{K} \Omega(f_k) \tag{9}$$

$$= \sum_{i=1}^{n} l(y_i, \hat{y}_i^{(t-1)} + f_t(x_i)) + \Omega(f_k) + \mathrm{constant}$$

Here, the Taylor expansion (censored at the second-order term) of the objective function in a round t is written as Eq. (10) below.

$$\mathrm{obj}^{(t)} \cong \sum_{i=1}^{n} \left[ l(y_i, \hat{y}_i^{(t-1)}) + g_i f_t(x_i) + \frac{1}{2} h_i f_t^2(x_i) \right] + \Omega(f_t) + \mathrm{constant} \tag{10}$$

Here, in Eq. (10), $g_i$ and $h_i$ are written as Eq. (11) below.

$$g_i = \partial_{\hat{y}_i^{(t-1)}} l(y_i, \hat{y}_i^{(t-1)})$$

$$h_i = \partial_{\hat{y}_i^{(t-1)}}^2 l(y_i, \hat{y}_i^{(t-1)}) \tag{11}$$

The constant term is ignored in Eq. (10), and then the objective function in a round t is written as Eq. (12).

$$\mathrm{obj}^{(t)} = \sum_{i=1}^{n} \left[ g_i f_t(x_i) + \frac{1}{2} h_i f_t^2(x_i) \right] + \Omega(f_t) \tag{12}$$

According to Eq. (12), the objective function in a round t is represented by a first derivative and a second derivative of the error function with respect to the predictive value in the previous round, and the regularization term. It can be understood that an error function of which first derivative and second derivative can be found can be applied.

We will now examine a decision tree model. FIG. 1 illustrates an exemplary decision tree model. A decision tree model is configured with nodes and leaves. Input to a node is input to the next node or leave, based on a certain branch condition. A leaf has a leaf weight, which is output for its input. For example, in FIG. 1, the leaf weight W2 of "leaf 2" is "−1".

The decision tree model is formulated as in Eq. (13).

$$f_t(x) = w_{q(x)}, w \in R^T q: R^d \to \{1, 2, \ldots T\} \qquad (13)$$

In Eq. (13), w is a leaf weight, and q is a tree structure. That is, input (sample data x) is allocated to any leaf according to the tree structure q, and the leaf weight of the leaf is output.

Here, the complexity of the decision tree model is defined as Eq. (14) below.

$$\Omega(f_t) = \gamma T + \frac{1}{2} \lambda \sum_{j=1}^{T} w_j^2 \qquad (14)$$

In Eq. (14), the first term is the complexity due to the number of leaves, and the second term is the square norm of the leaf weight. Here, γ is a hyperparameter controlling the importance of the regularization term. Based on the above, the objective function in a round t is organized as Eq. (15).

$$\begin{aligned} obj^{(t)} &\cong \sum_{i=1}^{n} \left[ g_i f_t(x_i) + \frac{1}{2} h_i f_t^2(x_i) \right] + \Omega(f_t) \\ &= \sum_{i=1}^{n} \left[ g_i w_q(x_i) + \frac{1}{2} h_i w_{q(x_i)}^2 \right] + \gamma T + \frac{1}{2} \lambda \sum_{j=1}^{T} w_j^2 \\ &= \sum_{j=1}^{T} \left[ \left( \sum_{i \in I_j} g_i \right) w_j + \frac{1}{2} \left( \sum_{i \in I_j} h_i + \lambda \right) w_j^2 \right] + \gamma T \\ &= \sum_{j=1}^{T} \left[ G_j w_j + \frac{1}{2} (H_j + \lambda) w_j^2 \right] + \gamma T \end{aligned} \qquad (15)$$

In Eq. (15), $I_j$, $G_j$, and $H_j$ are written as Eq. (16) below.

$$I_j = \{i | q(x_i) = j\}$$

$$G_j = \sum_{i \in I_j} g_i$$

$$H_j = \sum_{i \in I_j} h_i \qquad (16)$$

According to Eq. (15), the objective function in a certain round t is a quadratic function of the leaf weight w, and the minimum value of the quadratic function and the condition thereof are typically written as Eq. (17) below.

$$\operatorname{argmin}_w Gw + \frac{1}{2} H w^2 = -\frac{G}{H}, H > 0 \qquad (17)$$

$$\min_w Gw + \frac{1}{2} H w^2 = -\frac{1}{2} \frac{G^2}{H}$$

That is, when the decision tree structure q in a certain round t is determined, its objective function and leaf weight are as in Eq. (18) below.

$$w_j^* = \frac{G_j}{H_j + \lambda} \qquad (18)$$

$$obj = -\frac{1}{2} \sum_{j=1}^{T} \frac{G_j^2}{H_j + \lambda} + \gamma T$$

As described above, the leaf weight can be calculated when a decision tree structure in a certain round is determined. In the following, the learning procedure of a decision tree structure will be described.

One of the decision tree structure learning methods is a greedy algorithm. In a greedy algorithm, a decision tree structure is learned by, starting from depth 0 of a tree structure, calculating a split score (Gain) at each node and determining whether to split. The split score is found by Eq. (19) below.

$$\text{Gain} = \frac{1}{2} \left[ \frac{G_L^2}{H_L + \lambda} + \frac{G_R^2}{H_R + \lambda} - \frac{(G_L + G_R)^2}{H_L + H_R + \lambda} \right] - \gamma \qquad (19)$$

Here, $G_L$ and $H_L$ are gradient information of the sample split to the left node, $G_R$ and $H_R$ are gradient information of the sample split to the right, and γ is the regularization term. In Eq. (19), the first term in [ ] is the score (objective function) of sample data split to the left node, the second term is the score of sample data split to the right node, and the third term is the score with no split, representing the degree of improvement of the objective function by splitting.

The split score represented by Eq. (19) above indicates the goodness of split with a certain threshold of a certain feature quantity, but this alone cannot determine which condition is optimum. Then, a greedy algorithm finds split scores for all threshold candidates of all feature quantities and finds a condition with which the split score is largest. A greedy algorithm is a very simple algorithm, but its computational cost is high because split scores are found for all threshold candidates of all feature quantities. Then, a library such as XGBoost described later includes a scheme for reducing computational cost while keeping the performance.

XGBoost

XGBoost which is a well-known GBDT library will be described below. The learning algorithm of XGBoost includes two schemes for reducing threshold candidates and treating missing values.

First, reduction of threshold candidates will be described. The greedy algorithm described above has a disadvantage of high computational cost. In XGBoost, the number of threshold candidates is reduced by a method called Weighted Quantile Sketch. More specifically, in calculation of a split score (Gain), the sum of gradient information of sample data splitting to left and right is important, and only the thresholds with which the sum of gradient information changes at a certain ratio are explored. Specifically, a second-order gradient of a sample, h, is used. Letting f be the dimensions of a feature quantity, a set of the feature quantity and the second-order gradient h is written as Eq. (20) below.

$$D_f = \{(x_{1f}, h_1), (x_{2f}, h_2), \ldots (x_{nf}, h_n)\} \qquad (20)$$

The rank function $r_f$ is defined as Eq. (21) below.

$$r_f(z) = \frac{1}{\sum_{(x,h)\in D_f} h} \sum_{(x,h)\in D_f, x<z} h \qquad (21)$$

Here, z is a threshold candidate. The rank function $r_f$ illustrated in Eq. (21) means the proportion of the sum of second-order gradients of sample data smaller than a certain threshold candidate in the sum of second-order gradients of all sample data. Ultimately, for the feature quantity represented by the dimensions f, a set of threshold candidates $\{s_{f1}, s_{f2}, \ldots, s_{fl}\}$ has to be found and this is found by Eq. (22) below.

$$|r_f(s_{fj}) - r_f(s_{fj+1})| < \varepsilon$$

$$s_{f1} = \min(\{x_{1f}, x_{2f}, \ldots, x_{nf}\})$$

$$s_{fl} = \max(\{x_{1f}, x_{2f}, \ldots, x_{nf}\}) \qquad (22)$$

Here, ε is a parameter that determines the degree of reducing threshold candidates, and about 1/ε threshold candidates are obtained.

There are two patterns of Weighted Quantile Sketch: global weighted quantile sketch, which is performed at the initial node in a decision tree (at once for all sample data); and local weighted quantile sketch, which is performed for each node (each time for a sample allocated to the node). Since it is reported that the local is better in terms of generalization performance, XGBoost adopts the local.

Next, treating of missing values will be described. In GBDT and decision trees, and machine learning field, there is no common effective method for treating missing values of input sample data. One method is to complement a missing value with a mean value, a median value, a collaborative filter, or the like. Another method is to remove a feature quantity with many missing values. However, those methods are not successful in many cases in terms of performance. The structured data often includes missing values and some kind of solution is sought in practice.

In XGBoost, a learning algorithm is designed such that sample data including missing values are directly handled. In determining the split score of a node, this method determines a score when data with a missing value is allocated to either left or right node. When Weighted Quantile Sketch described above is performed, threshold candidates are found for a set, excluding sample data that includes missing values.

LightGBM

LightGBM which is a GBDT library will now be described. LightGBM employs quantization of feature quantities, called binning, as preprocessing and employs a fast algorithm using a GPU for split score calculation. When compared with XGBoost, LightGBM has equivalent performance with a learning speed a few times higher and thus has recently attracted more users.

First of all, quantization of feature quantities is described. When a data set is large-scale, split scores have to be calculated for a large amount of threshold candidates. LightGBM reduces the number of threshold candidates by quantizing feature quantities as preprocessing of learning. Quantization does not change the values and the number of threshold candidates for each node unlike in XGBoost and is an essential process when a GPU is used.

There have been various studies on quantization of feature quantities, called binning. In LightGBM, a feature quantity is divided into k bins with k threshold candidates, where k is 255, 63, 15, or the like. The performance or learning speed varies according to data sets.

Quantizing a feature quantity simplifies calculation of a split score. Specifically, threshold candidates are simply quantized values. Thus, histograms of first-order gradient and second-order gradient are created for each feature quantity, and the split score is obtained for each bin (quantized value). This is called feature quantity histogram.

Next, calculation of a split score using a GPU will be described. There are at most 256 patterns in calculation of a split score as the feature quantity is quantized. However, some data sets have a sample size of tens of thousands of sample data. Therefore, histogram creation is dominant in the learning time. As described above, in calculation of a split score, a feature quantity histogram has to be obtained. When a GPU is used, a plurality of threads need to update the same histogram and may update the same bin. Therefore, atomic operations need to be used, and when the ratio of updating the same bin is high, the performance is degraded. Then, in creating a histogram, LightGBM decides whether a value is to be updated from the first-order gradient histogram or the second-order gradient histogram for each thread, thereby reducing the frequency of updating the same bin.

Configuration of Learning Classification Device

Figure 2:
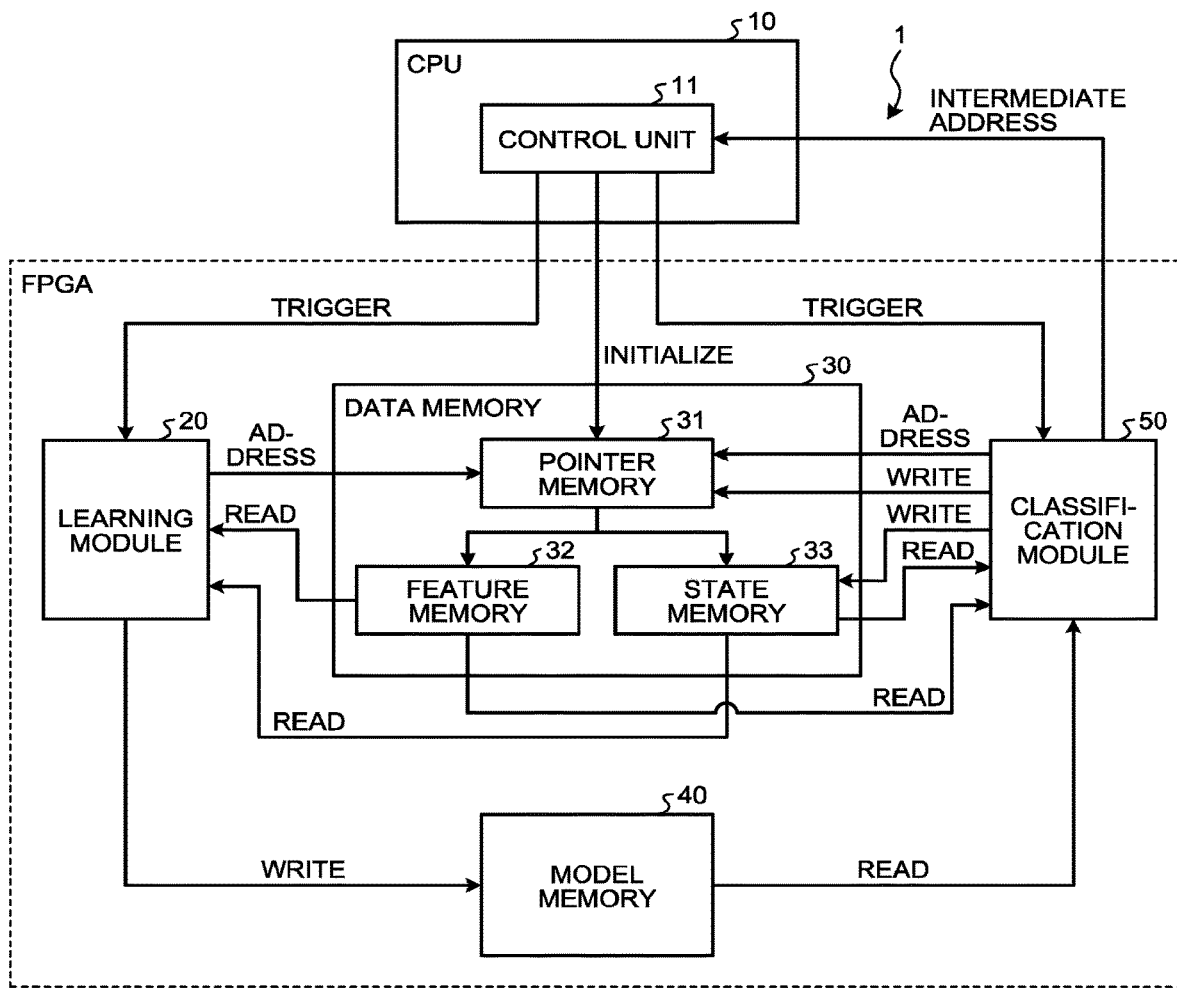
FIG. 2 is a diagram illustrating an exemplary module configuration of a learning classification device according to embodiments.
Figure 3:
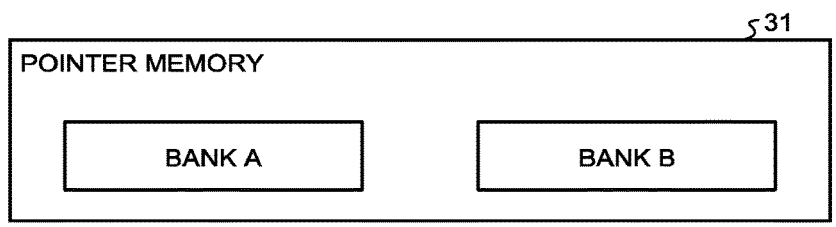
FIG. 3 is a diagram illustrating an exemplary configuration of a pointer memory.
Figure 4:
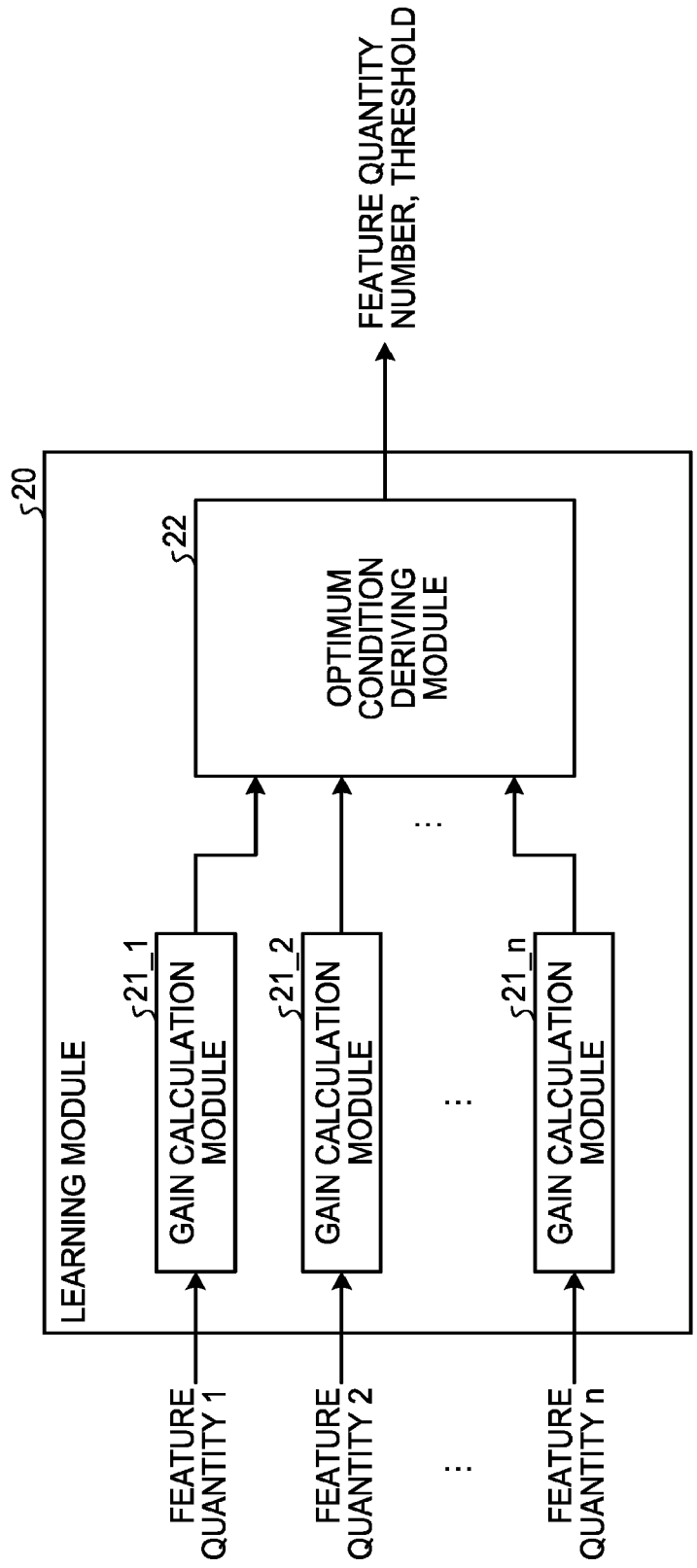
FIG. 4 is a diagram illustrating an exemplary module configuration of a learning module.

FIG. 2 is a diagram illustrating an exemplary module configuration of the learning classification device according to embodiments. FIG. 3 is a diagram illustrating an exemplary configuration of a pointer memory. FIG. 4 is a diagram illustrating an exemplary module configuration of a learning module. Referring to FIG. 2 to FIG. 4, the learning classification device 1 according to the present embodiment will be described.

As illustrated in FIG. 2, the learning classification device 1 according to the present embodiment includes a CPU 10, a learning module 20 (learning unit), a data memory 30, a model memory 40, and a classification module 50 (classification unit). Among those, the learning module 20, the data memory 30, the model memory 40, and the classification module 50 are configured by an FPGA. The CPU 10 and the FPGA can communicate data through a bus. The learning classification device 1 may include, in addition to the components illustrated in FIG. 2, other components, for example, including a RAM serving as a working area for the CPU 10, a read only memory (ROM) storing a program executed by the CPU 10, an auxiliary storage device for storing various data (for example, program), and a communication interface (I/F) for communicating with an external device.

The CPU 10 is a computing unit for controlling the learning of GBDT as a whole. The CPU 10 includes a control unit 11. The control unit 11 controls the modules including the learning module 20, the data memory 30, the model memory 40, and the classification module 50. The control unit 11 is implemented by a program executed by the CPU 10.

The learning module 20 is a hardware module that calculates the number of the optimum feature quantity (hereinafter may be referred to as "feature quantity number") for each node in a decision tree and a threshold, calculates a leaf weight, if the node is a leaf, and writes the result into the model memory 40. As illustrated in FIG. 4, the learning module 20 includes gain calculation modules 21_1, 21_2, . . . , 21_n (gain calculation units) and an optimum condition deriving module 22 (deriving unit). Here, n is a number equal to or greater than at least the number of feature quantities of sample data (including both training data and classification data). The gain calculation modules 21_1, 21_2, . . . , 21_n are simply called "gain calculation module 21" when any given gain calculation module is referred to or when the gain calculation modules are collectively referred to.

The gain calculation module 21 is a module that calculates a split score in each threshold for the corresponding feature quantity, of the feature quantities included in the input sample data, using Eq. (19) above. Here, of the sample data, the training data includes a feature quantity as well as a label (true value). Of the sample data, the classification data includes a feature quantity but does not include a label. The gain calculation modules 21 have respective memories for computing and storing the histograms for all the feature quantities input at a time (in one clock) and compute all the feature quantities in parallel. Based on the result of the histograms, the gains of the feature quantities are calculated in parallel. This configuration enables the processing for all feature quantities at once or simultaneously and thereby can drastically increase the speed of a learning process. In this way, the method of reading and processing all the feature quantities in parallel is called Feature Parallel. For implementation of this method, all feature quantities have to be read from the data memory at once (one clock). This method is therefore unable to be implemented by a common memory having a data width of 32 bits or 256 bits. With software, the number of bits of data handled by a common CPU at a time is only 64 bits. With 100 feature quantities and 8 bits for each feature quantity, 8000 bits is required and cannot be handled. Therefore, according to a conventional method, different feature quantities are stored for each address of a memory (for example, a 64-bit width that can be handled by a CPU), and all of the feature quantities are stored over a plurality of addresses. By contrast, according to the present method, a novel technique lies in that all the feature quantities are stored in one address of a memory and all the feature quantities are read by single access.

As described above, GBDT is unable to parallelize decision tree learning. Therefore, how fast each individual decision tree is learned is dominant for the speed of a learning process. On the other hand, RF, which performs ensemble learning, easily parallelizes a learning process for each decision tree because there is no dependency between decision trees during learning. RF, however, is less accurate than GBDT. As described above, for leaning of GBDT with higher accuracy than RF, adopting Feature Parallel as described above can increase the speed of a decision trees learning process.

The gain calculation module 21 outputs the calculated split score to the optimum condition deriving module 22.

The optimum condition deriving module 22 receives the split score corresponding to the feature quantity output from each gain calculation module 21 and derives the number of the feature quantity (feature quantity number) and the threshold with the largest split score. The optimum condition deriving module 22 writes the derived feature quantity number and threshold into the model memory 40, as branch condition data of the corresponding node (an example of data of a node).

The data memory 30 is an SRAM storing various data. The data memory 30 includes a pointer memory 31, a feature memory 32, and a state memory 33.

The pointer memory 31 is a memory that stores the storage address of sample data stored in the feature memory 32. As illustrated in FIG. 3, the pointer memory 31 includes a bank A (bank region) and a bank B (bank region). The operation of storing the storage address of sample data into two banks, bank A and bank B, will be detailed later with reference to FIG. 5 to FIG. 13. The pointer memory 31 may include three or more banks.

The feature memory 32 is a memory that stores sample data (including training data and classification data).

The state memory 33 stores state information (w, g, h above) and label information.

The model memory 40 is an SRAM that stores the branch condition data (feature quantity number, threshold) for each node of a decision tree, a leaf flag (flag information, an example of data of a node) indicating whether the node is a leaf, and a leaf weight, if the node is a leaf.

The classification module 50 is a hardware module that classifies sample data for each node, each decision tree. The classification module 50 calculates state information (w, g, h) and writes the calculated state information into the state memory 33.

The classification module 50 can not only classify (split) sample data (training data) in a learning process as described above but also classify classification data in a classification process for sample data (classification data) with the same module configuration. In a classification process, the processing by the classification module 50 can also be pipelined by reading all feature quantities at once, so that the processing can be as fast as classification of one sample data for each clock. If feature quantities are unable to be read at once, which feature quantity is necessary is unknown until splitting into nodes. Therefore, pipelining fails to be achieved by accessing the address of the corresponding feature quantity each time.

A plurality of classification modules 50 may be included, so that a plurality of pieces of classification data are divided (Data Parallel) and allocated to the classification modules 50, each of which performs a classification process, thereby speeding up a classification process.

Learning Process of Learning Classification Device
Referring to FIG. 5 to FIG. 13, a learning process of the learning classification device 1 will be specifically described.

Initialization

Figure 5:
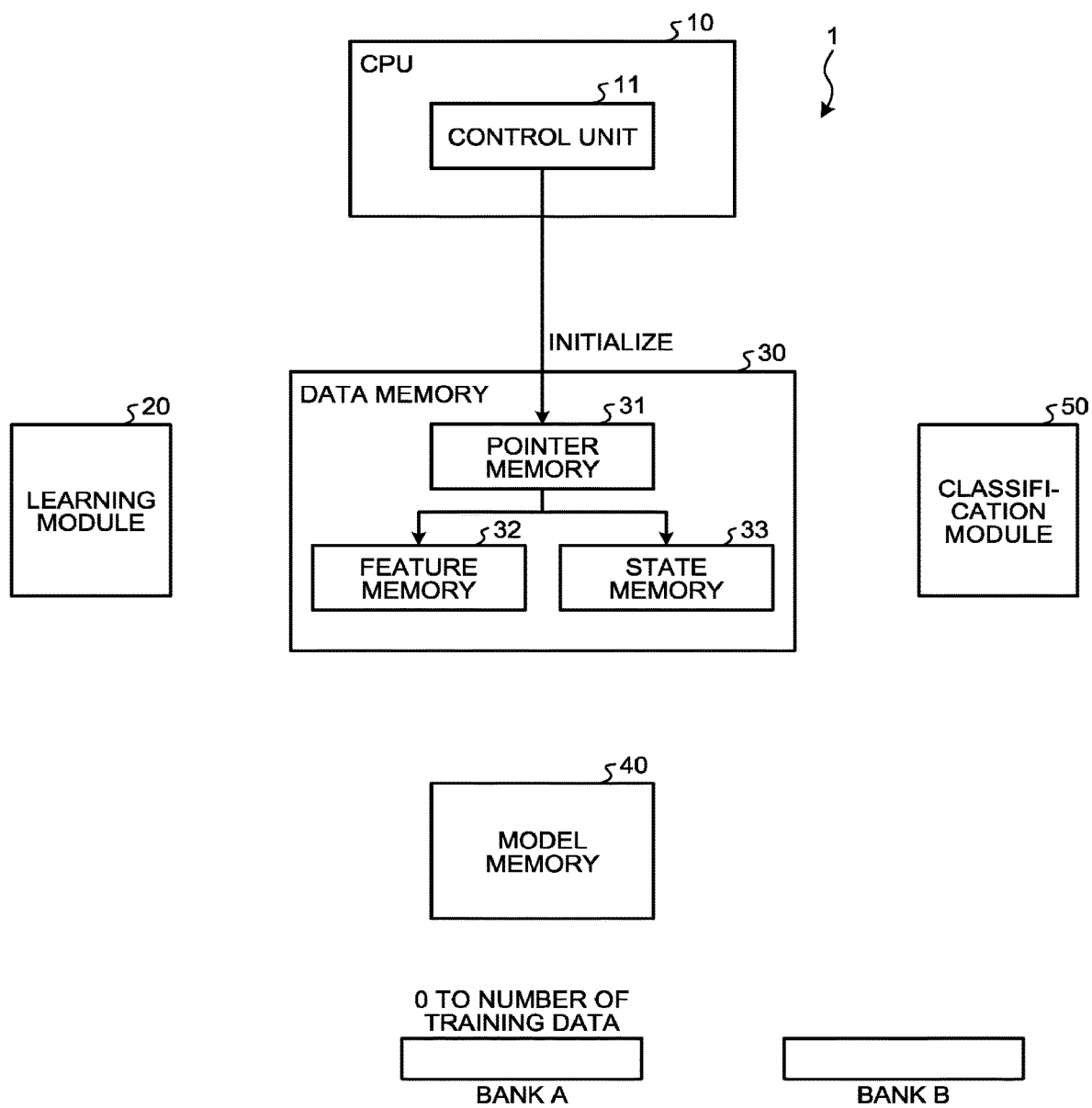
FIG. 5 is a diagram illustrating the operation of modules in initialization of the learning classification device according to embodiments.

FIG. 5 is a diagram illustrating the operation of modules in initialization of the learning classification device according to embodiments. As illustrated in FIG. 5, first of all, the control unit 11 initializes the pointer memory 31. For example, as illustrated in FIG. 5, the control unit 11 writes the addresses of sample data (training data) in the feature memory 32 by the number of training data in order (for example, in order from the lower address) into the bank A in the pointer memory 31.

It is noted that all of training data may not be used (all the addresses may not be written), and training data selected randomly based on the probability according to predetermined random numbers may be used by data subsampling (the addresses of the selected training data may be written). For example, when data subsampling is 0.5, of all the addresses of training data with a 50% probability according to random numbers, half of the addresses may be written into the pointer memory 31 (here, the bank A). In generating random numbers, pseudo random numbers generated by a linear feedback shift register (LFSR) may be used.

All the feature quantities of training data may not be used in learning. Only the feature quantities selected randomly (for example, half selected) based on the probability according to random numbers as described above may be used by feature subsampling. In this case, for example, as data of feature quantities other than the feature quantities selected by feature subsampling, constants may be output from the feature memory 32. This operation improves generalization performance for unknown data (classification data).

Determination of Branch Condition Data of Depth 0/Node 0

Figure 6:
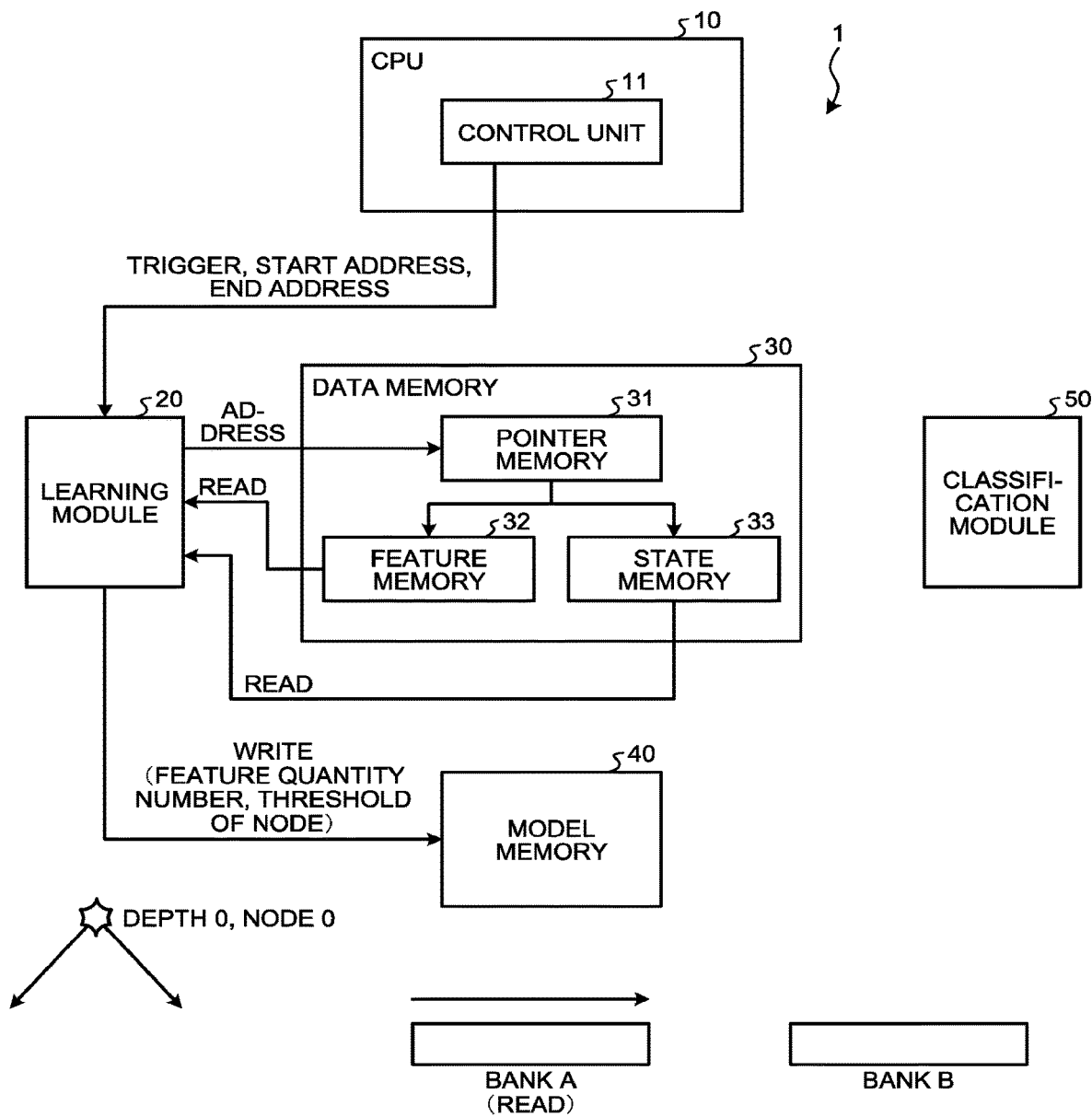
FIG. 6 is a diagram illustrating the operation of modules for determining a node parameter of depth 0, node 0 in the learning classification device according to embodiments.

FIG. 6 is a diagram illustrating the operation of modules for determining a node parameter of depth 0, node 0 in the learning classification device according to embodiments. The top level of a decision tree is denoted as "depth 0", and the levels below are denoted as "depth 1", "depth 2", ..., in order. The left node on a certain level is denoted as "node 0", and the nodes to the right are denoted as "node 1", "node 2", ..., in order.

As illustrated in FIG. 6, first of all, the control unit 11 transmits a start address and an end address to the learning module 20 to trigger the start of a process by the learning module 20. The learning module 20 specifies the address of target training data from the pointer memory 31 (bank A) based on the start address and the end address, reads the training data (feature quantity) from the feature memory 32 using the specified address, and reads state information (w, g, h) from the state memory 33.

In this case, as described above, each gain calculation module 21 in the learning module 20 calculates a histogram of the corresponding feature quantity, stores the histogram into its SRAM, and calculates a split score in each threshold based on the result. The optimum condition deriving module 22 of the learning module 20 then receives the split score corresponding to the feature quantity output from each gain calculation module 21 and derives the number of the feature quantity (feature quantity number) and the threshold with the largest split score. The optimum condition deriving module 22 then writes the derived feature quantity number and threshold as branch condition data of the corresponding node (depth 0, node 0) into the model memory 40. In doing so, the optimum condition deriving module 22 sets the leaf flag to "0" to indicate that the node (depth 0, node 0) is further split, and writes the data of the node (which may be part of the branch condition data) into the model memory 40.

The learning module 20 performs the operation above by successively specifying the address of training data written in the bank A and reading each training data from the feature memory 32 using the address.

Data Splitting Process at Depth 0/Node 0

Figure 7:
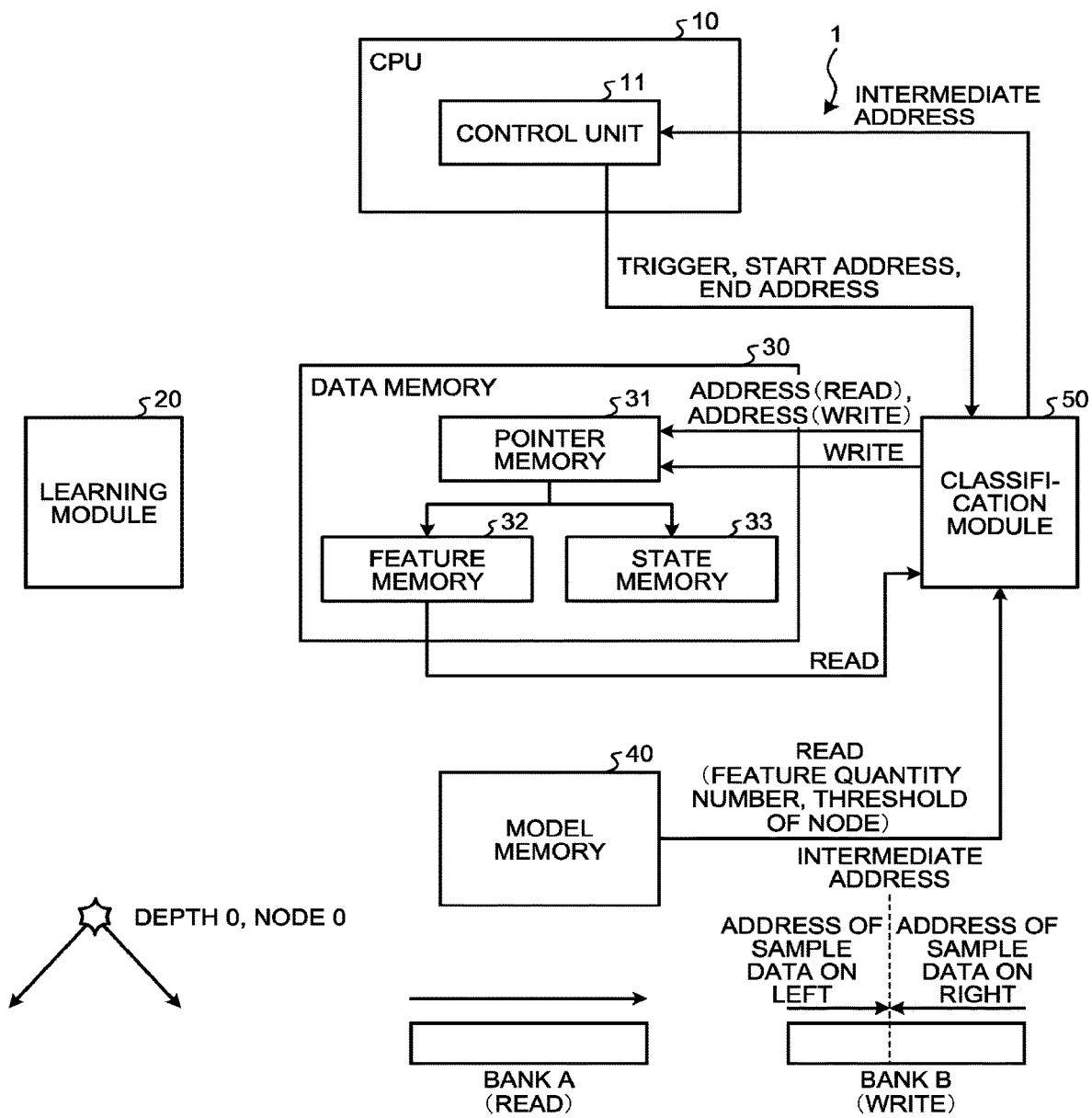
FIG. 7 is a diagram illustrating the operation of modules in splitting at depth 0, node 0 in the learning classification device according to embodiments.

FIG. 7 is a diagram illustrating the operation of modules in splitting at depth 0, node 0 in the learning classification device according to embodiments.

As illustrated in FIG. 7, the control unit 11 transmits a start address and an end address to the classification module 50 to trigger the start of a process by the classification module 50. The classification module 50 specifies the address of target training data from the pointer memory 31 (bank A) based on the start address and the end address and reads the training data (feature quantity) from the feature memory 32 using the specified address. The classification module 50 reads branch condition data (feature quantity number, threshold) of the corresponding node (depth 0, node 0) from the model memory 40. The classification module 50 then determines whether to split the read sample data to the left or to the right of the node (depth 0, node 0) in accordance with the branch condition data and writes the address of the training data in the feature memory 32 into the other bank (write bank) (here, bank B) (bank region for writing) different from the read bank (here, bank A) (bank region for reading) in the pointer memory 31, based on the determination result.

In doing so, as illustrated in FIG. 7, when determining to split to the left of the node, the classification module 50 writes the address of the training data in order from the lower address of the bank B. When determining to split to the right of the node, the classification module 50 writes the address of the training data in order from the higher address of the bank B. Thus, in the write bank (bank B), the addresses can be written separately such that the address of training data split to the left of the node is written in the lower address whereas the address of training data split to the right of the node is written into the higher address. In the write bank, the address of training data split to the left of the node may be written in the higher address, and the address of training data split to the right of the node may be written in the lower address.

In this way, the pointer memory 31 is configured with two banks, namely, bank A and bank B in which read and write is performed alternately, as described above. Accordingly, with the limited capacity of the SRAM in the FPGA, the memory can be efficiently used. Simply, each of the feature memory 32 and the state memory 33 may be configured with two banks. However, since data indicating an address in the feature memory 32 is typically smaller than sample data, the memory usage can be reduced more by preparing the pointer memory 31 and indirectly specifying the address as in the present embodiment.

For the operation above, the classification module 50 performs a splitting process for all training data. However, after the splitting process is finished, the training data are not necessarily divided equally on the left and the right of the node (depth 0, node 0). Therefore, the classification module 50 returns the address (intermediate address) in the write bank (bank B) corresponding to the boundary between the address of training data split to the left and the address of training data split to the right to the control unit 11. The intermediate address is used in the next splitting process.

Determination of Branch Condition Data at Depth 1/Node 0

Figure 8:
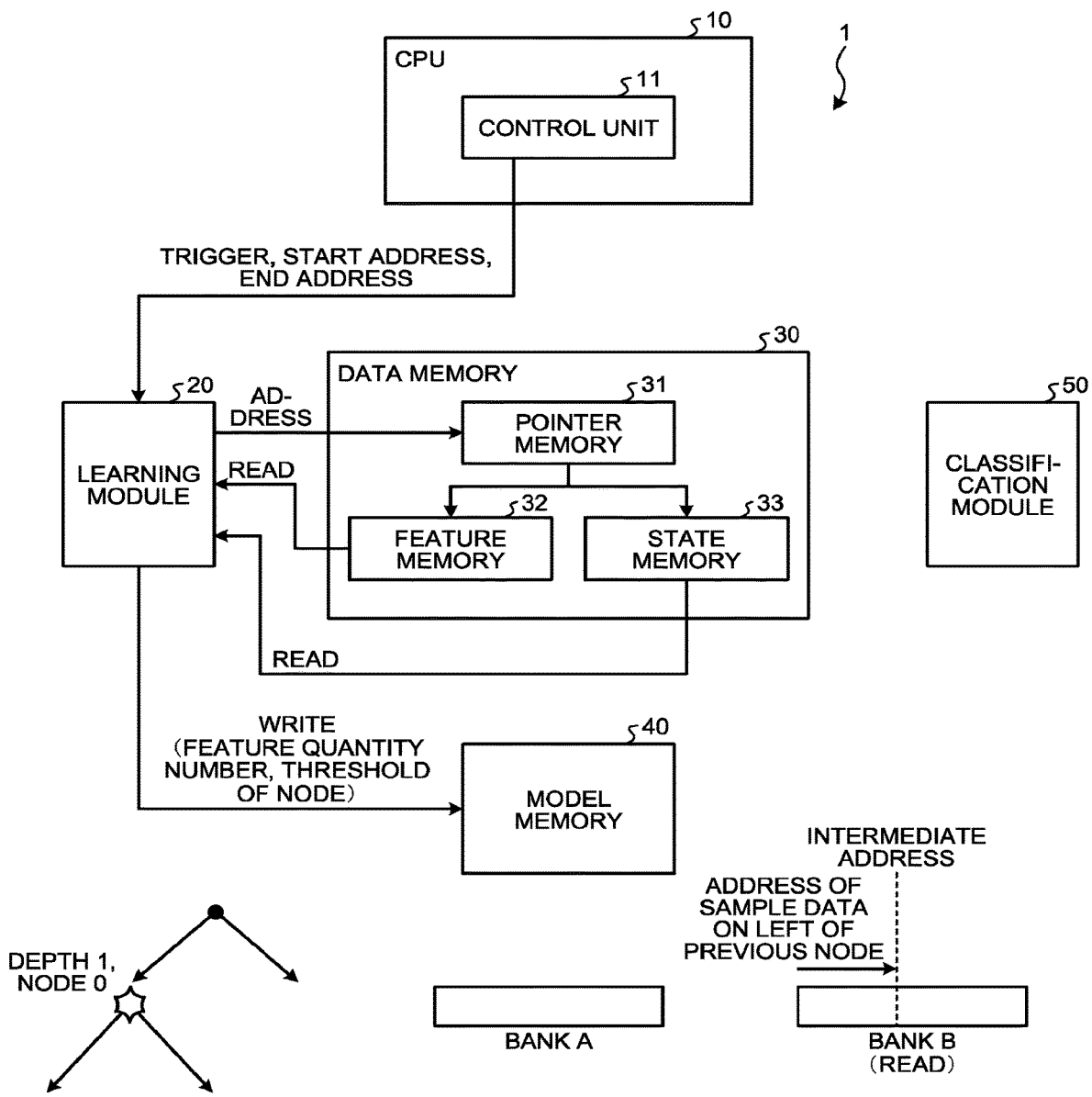
FIG. 8 is a diagram illustrating the operation of modules for determining a node parameter at depth 1, node 0 in the learning classification device according to embodiments.

FIG. 8 is a diagram illustrating the operation of modules for determining a node parameter at depth 1, node 0 in the learning classification device according to embodiments. Basically, this process is similar to the process of determining branch condition data at depth 0/node 0 illustrated in FIG. 6, except that the roles of the bank A and the bank B of the pointer memory 31 are reversed because the level of a target node is changed (from depth 0 to depth 1). Specifically, the bank B is the read bank and the bank A is the write bank (see FIG. 9).

As illustrated in FIG. 8, the control unit 11 transmits a start address and an end address to the learning module 20, based on the intermediate address received from the classification module 50 in the process at depth 0, to trigger the start of a process by the learning module 20. The learning module 20 specifies the address of target training data from the pointer memory 31 (bank B) based on the start address and the end address, reads the training data (feature quantity) from the feature memory 32 using the specified address, and reads state information (w, g, h) from the state memory 33. Specifically, as illustrated in FIG. 8, the learning module 20 specifies the address in order from the left of the bank B (the lower address) to the intermediate address.

In this case, as described above, each gain calculation module 21 of the learning module 20 stores the feature quantity of the read training data into its SRAM and calculates a split score in each threshold. The optimum condition deriving module 22 of the learning module 20 then receives the split score corresponding to the feature quantity output from each gain calculation module 21 and derives the number of the feature quantity (feature quantity number) and the threshold with the largest split score. The optimum condition deriving module 22 then writes the derived feature quantity number and threshold as branch condition data of the corresponding node (depth 1, node 0) into the model memory 40. In doing so, the optimum condition deriving module 22 sets the leaf flag to "0" to indicate that the node (depth 1, node 0) is further split, and writes the data of the node (which may be part of the branch condition data) into the model memory 40.

The learning module 20 performs the operation described above by successively specifying the address from the left of the bank B (lower address) to the intermediate address and reading each training data from the feature memory 32 using the specified address.

Data Splitting Process at Depth 1/Node 0

Figure 9:
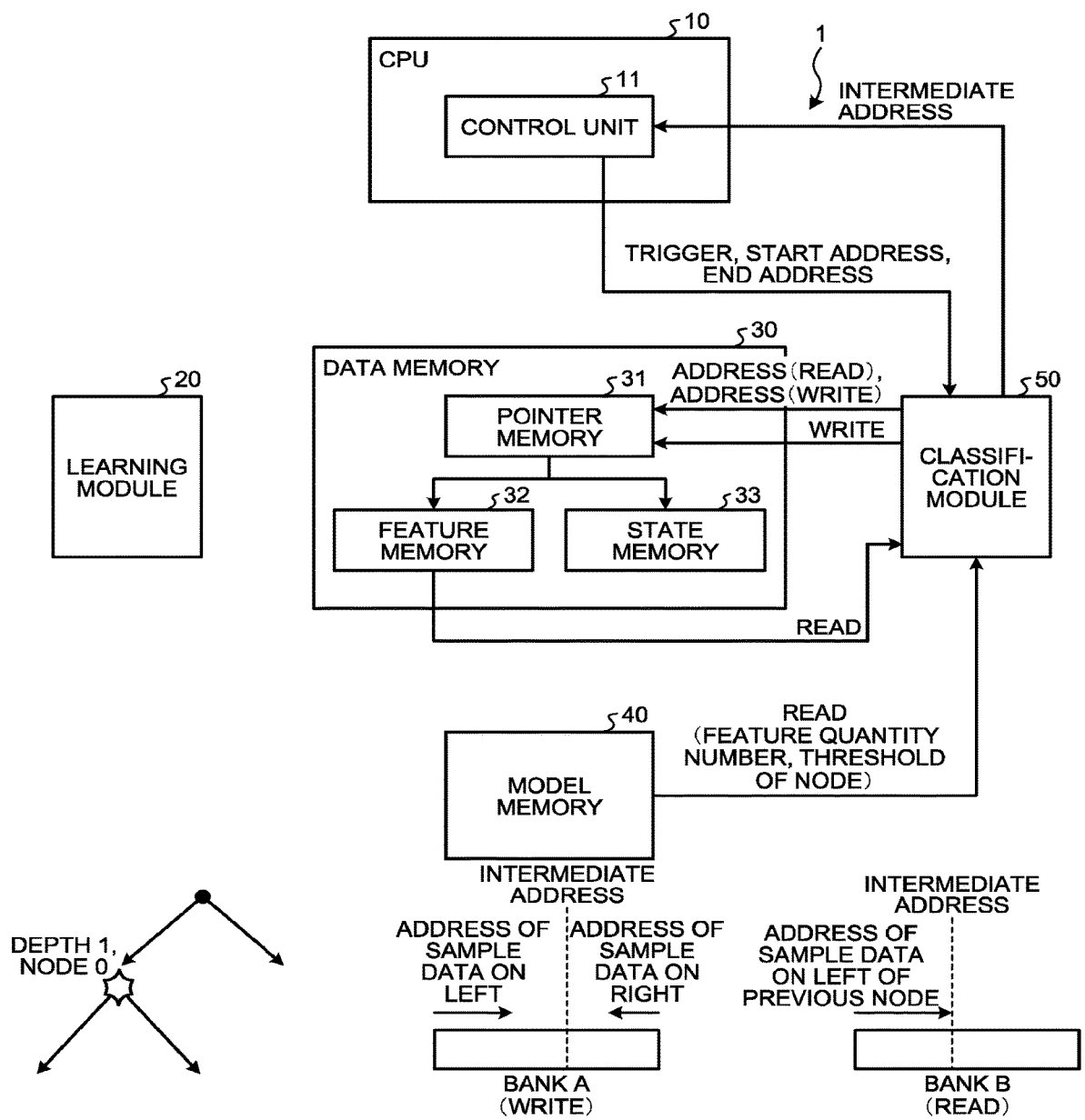
FIG. 9 is a diagram illustrating the operation of modules in splitting at depth 1, node 0 in the learning classification device according to embodiments.

FIG. 9 is a diagram illustrating the operation of modules in splitting at depth 1, node 0 in the learning classification device according to embodiments.

As illustrated in FIG. 9, the control unit 11 transmits a start address and an end address to the classification module 50, based on the intermediate address received from the classification module 50 in the process at depth 0, to trigger the start of a process by the classification module 50. The classification module 50 specifies the address of target training data from the left of the pointer memory 31 (bank B) based on the start address and the end address and reads the training data (feature quantity) from the feature memory 32 using the specified address. The classification module 50 reads branch condition data (feature quantity number, threshold) of the corresponding node (depth 1, node 0) from the model memory 40. The classification module 50 then determines whether to split the read sample data to the left or split to the right of the node (depth 1, node 0) in accordance with the branch condition data and writes the address of the training data in the feature memory 32 into the other bank (write bank) (here, bank A) (bank region for writing) different from the read bank (here, bank B) (bank region for reading) in the pointer memory 31, based on the determination result.

In doing so, as illustrated in FIG. 9, when determining to split to the left of the node, the classification module 50 writes the address of the training data in order from the lower address of the bank A. When determining to split to the right of the node, the classification module 50 writes the address of the training data in order from the higher address of the bank A. Thus, in the write bank (bank A), the addresses can be written separately such that the address of training data split to the left of the node is written in the lower address whereas the address of training data split to the right of the node is written in the higher address. In the write bank, the address of training data split to the left of the node may be written in the higher address, and the address of training data split to the right of the node maybe written in the lower address.

For the operation above, the classification module 50 performs the splitting process for, of all training data, training data specified by the address written on the left with respect to the intermediate address of the bank B. However, after the splitting process is finished, training data are not necessarily divided equally into the right and the left of the node (depth 1, node 0). Therefore, the classification module 50 returns the address (intermediate address) in the write bank (bank A) corresponding to the intermediate between the address of training data split to the left and the address of training data split to the right to the control unit 11. The intermediate address is used in the next splitting process.

Determination of Branch Condition Data of Depth 1/Node 1

Figure 10:
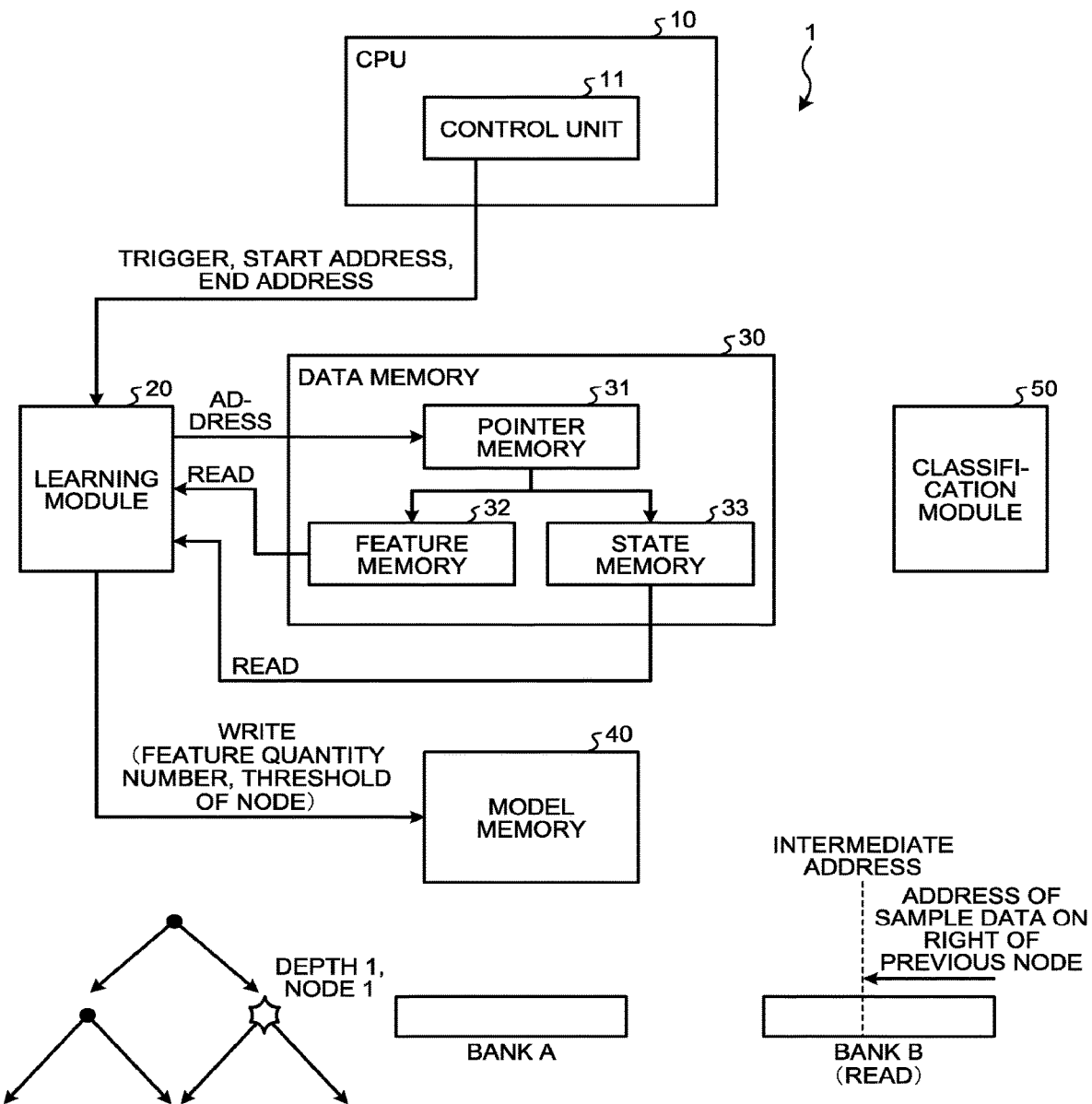
FIG. 10 is a diagram illustrating the operation of modules for determining a node parameter of depth 1, node 1 in the learning classification device according to embodiments.

FIG. 10 is a diagram illustrating the operation of modules for determining a node parameter of depth 1, node 1 in the learning classification device according to embodiments. In the same manner as in FIG. 8, since this node is on the same level as the node of Depth 1/Node 0, the bank B is the read bank and the bank A is the write bank (see FIG. 11).

As illustrated in FIG. 10, the control unit 11 transmits a start address and an end address to the learning module 20, based on the intermediate address received from the classification module 50 in the process at depth 0, to trigger the start of a process by the learning module 20. The learning module 20 specifies the address of target training data from the pointer memory 31 (bank B) based on the start address and the end address, reads the training data (feature quantity) from the feature memory 32 using the specified address, and reads state information (w, g, h) from the state memory 33. Specifically, as illustrated in FIG. 10, the learning module 20 specifies the address in order from the right (higher address) of the bank B to the intermediate address.

In this case, as described above, each gain calculation module 21 of the learning module 20 stores the feature quantity of the read training data into its SRAM and calculates a split score in each threshold. The optimum condition deriving module 22 of the learning module 20 then receives the split score corresponding to the feature quantity output from each gain calculation module 21 and derives the number of the feature quantity (feature quantity number) and the threshold with the largest split score. The optimum condition deriving module 22 then writes the derived feature quantity number and threshold as branch condition data of the corresponding node (depth 1, node 1) into the model memory 40. In doing so, the optimum condition deriving module 22 sets the leaf flag to "0" to indicate that the node (depth 1, node 1) is further split, and writes the data of the node (which may be part of the branch condition data) into the model memory 40.

The learning module 20 performs the operation above by specifying the address in order from the right of the bank B (higher address) to the intermediate address and reading each training data from the feature memory 32 using the specified address.

Data Splitting Process at Depth 1/Node 1

Figure 11:
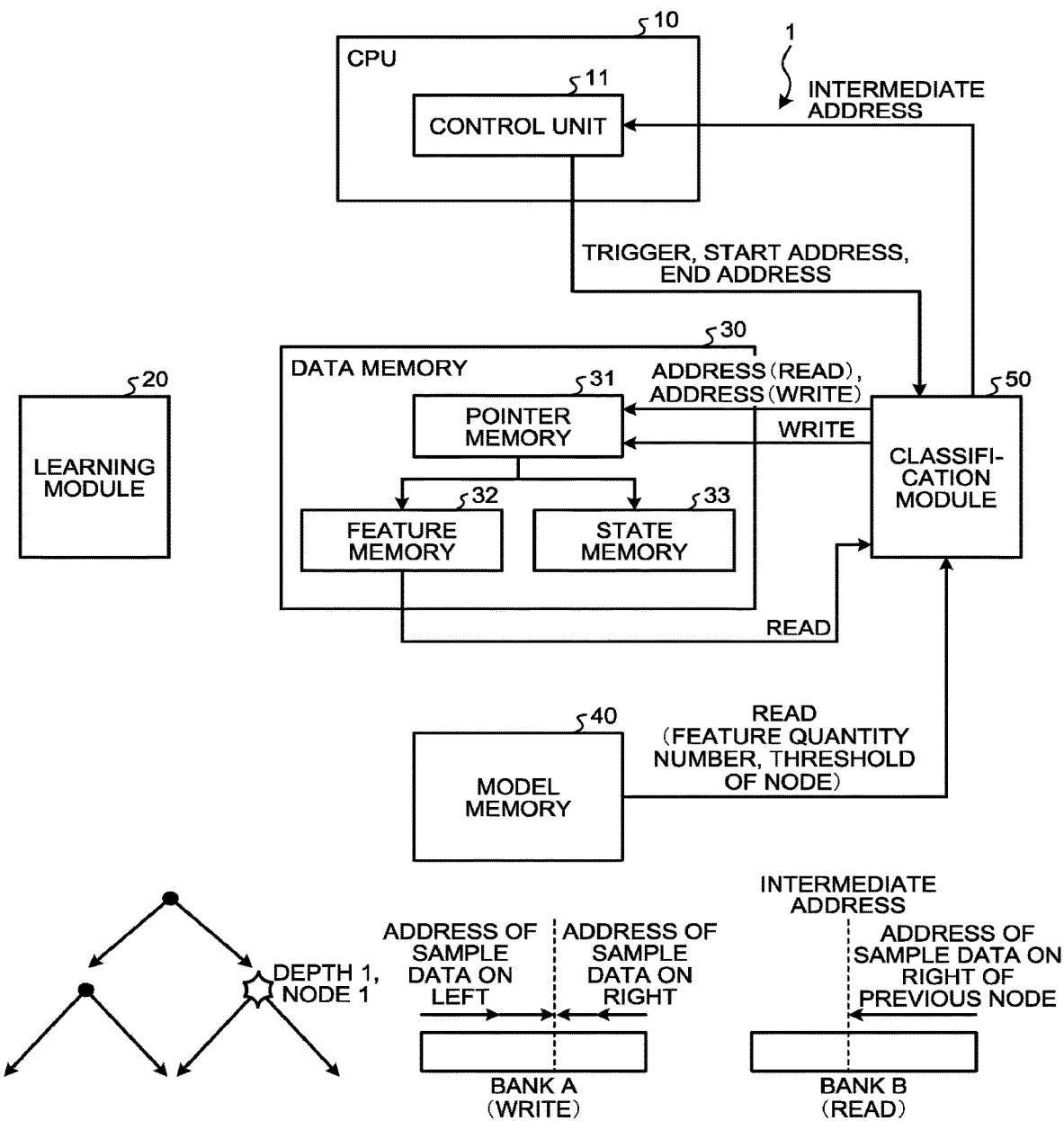
FIG. 11 is a diagram illustrating the operation of modules in splitting at depth 1, node 1 in the learning classification device according to embodiments.

FIG. 11 is a diagram illustrating the operation of modules in splitting at depth 1, node 1 in the learning classification device according to embodiments.

As illustrated in FIG. 11, the control unit 11 transmits a start address and an end address to the classification module 50, based on the intermediate address received from the classification module 50 in the process at depth 0, to trigger the start of a process by the classification module 50. The classification module 50 specifies the address of target training data from the right of the pointer memory 31 (bank B) based on the start address and the end address and reads the training data (feature quantity) from the feature memory 32 using the specified address. The classification module 50 reads branch condition data (feature quantity number, threshold) of the corresponding node (depth 1, node 1) from the model memory 40. The classification module 50 then determines whether to split the read sample data to the left or split to the right of the node (depth 1, node 1) in accordance with the branch condition data and writes the address of the training data in the feature memory 32 into the other bank (write bank) (here, bank A) (bank region for writing) different from the read bank (here, bank B) (bank region for reading) in the pointer memory 31, based on the determination result.

In doing so, as illustrated in FIG. 11, when determining to split to the left of the node, the classification module 50 writes the address of the training data in order from the lower address of the bank A. When determining to split to the right of the node, the classification module 50 writes the address of the training data in order from the higher address of the bank A. Thus, in the write bank (bank A), the addresses can be written separately such that the address of training data split to the left of the node is written in the lower address whereas the address of training data split to the right of the node is written in the higher address. In the write bank, the address of training data split to the left of the node may be written in the higher address, and the address of training data split to the right of the node may be written in the lower address. In this case, the operation in FIG. 9 needs to be adapted.

For the operation above, the classification module 50 performs the splitting process for, of all training data, training data specified by the address written on the right with respect to the intermediate address of the bank B. However, after the splitting process is finished, training data are not necessarily divided equally into the left and the right of the node (depth 1, node 1). Therefore, the classification module 50 returns the address (intermediate address) in the write bank (bank A) corresponding to the intermediate between the address of training data split to the left and the address of training data split to the right to the control unit 11. The intermediate address is used in the next splitting process.

No Split in Determination of Branch Condition Data of Depth 1/Node 1

Figure 12:
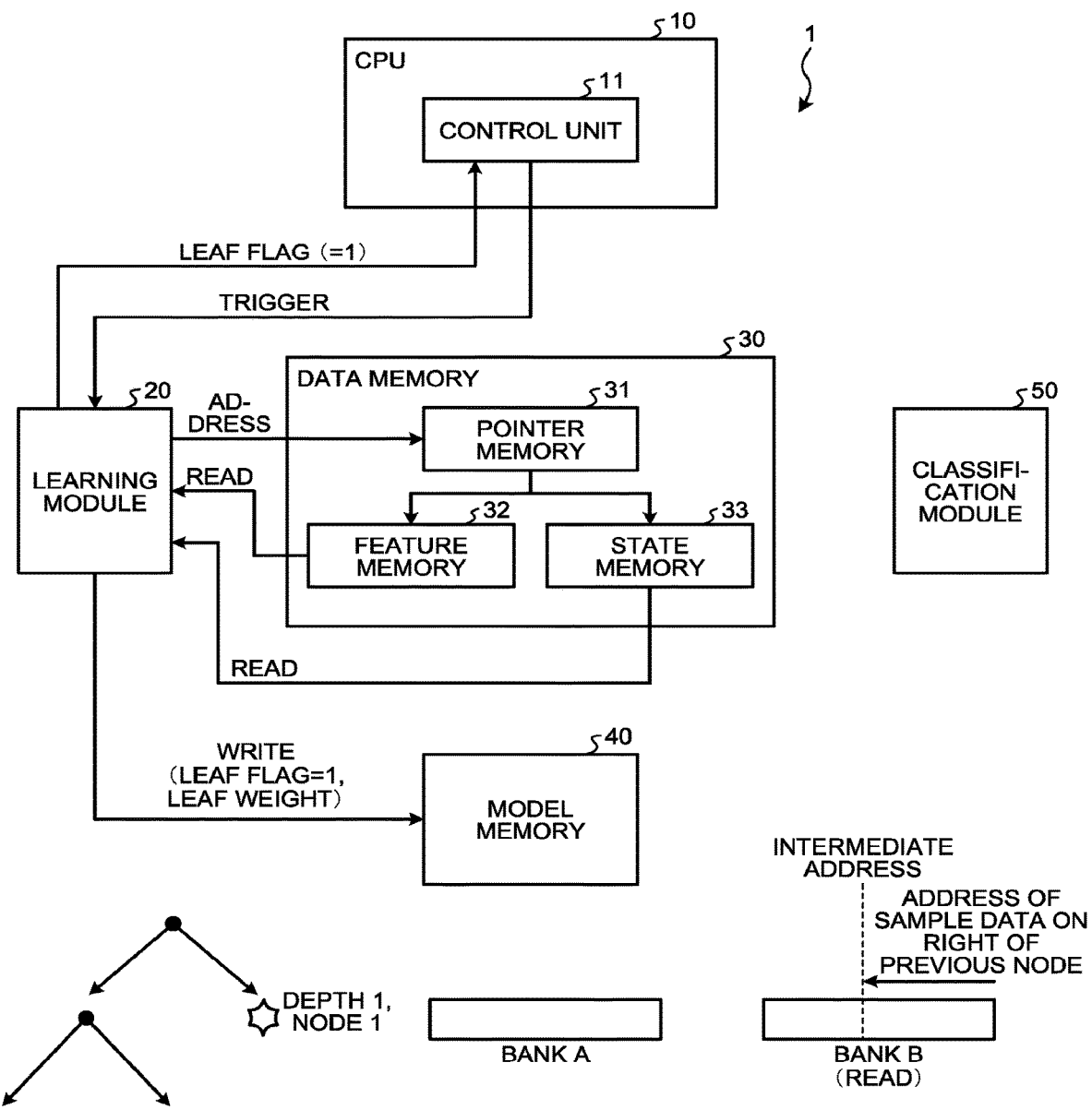
FIG. 12 is a diagram illustrating the operation of modules when there is no split in the determination of the node parameter of depth 1, node 1 in the learning classification device according to embodiments.

FIG. 12 is a diagram illustrating the operation of modules when there is no split in the determination of the node parameter of depth 1, node 1 in the learning classification device according to embodiments. In the same manner as in FIG. 8, since this node is on the same level as the node of Depth 1/Node 0, the bank B is the read bank.

As illustrated in FIG. 12, the control unit 11 transmits a start address and an end address to the learning module 20, based on the intermediate address received from the classification module 50 in the process at depth 0, to trigger the start of a process by the learning module 20. The learning module 20 specifies the address of target training data from the pointer memory 31 (bank B) based on the start address and the end address, reads the training data (feature quantity) from the feature memory 32 using the specified address, and reads state information (w, g, h) from the state memory 33. Specifically, as illustrated in FIG. 12, the learning module 20 specifies the address in order from the right of the bank B (higher address) to the intermediate address.

When determining that there is no further split from the node (depth 1, node 1), for example, based on the calculated split score, the learning module 20 sets the leaf flag to "1", writes data of the node (which may be part of the branch condition data) to the model memory 40, and transmits that the leaf flag of the node is "1" to the control unit 11. It is thus recognized that the node (depth 1, node 1) is not further split into the lower level. When the leaf flag of the node (depth 1, node 1) is "1", the learning module 20 writes the leaf weight (w) (which may be part of the branch condition data) into the model memory 40, instead of the feature quantity number and the threshold. This can reduce the capacity of the model memory 40 compared with separate capacities.

The processes above illustrated in FIG. 6 to FIG. 12 are performed for each level (depth) to complete the entire decision tree (decision tree is learned).

When Learning of Decision Tree is Completed

Figure 13:
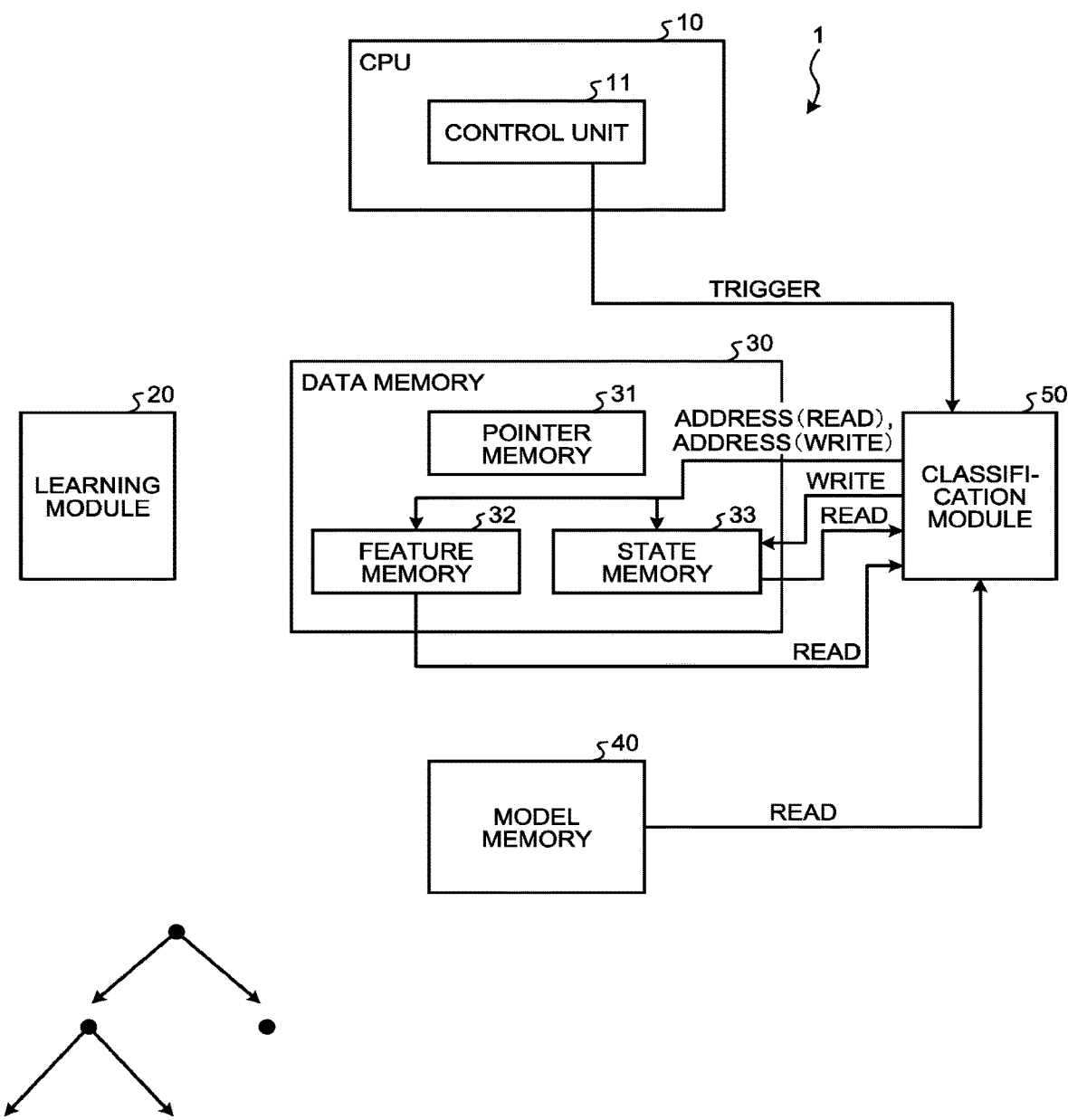
FIG. 13 is a diagram illustrating the operation of modules in updating state information of all sample data when learning of a decision tree is completed in the learning classification device according to embodiments.

FIG. 13 is a diagram illustrating the operation of modules when the state information of all sample data is updated when learning of a decision tree is completed in the learning classification device according to embodiments.

When learning of one decision tree that constitutes GBDT is completed, it is necessary to calculate a first-order gradient g and a second-order gradient h corresponding to the error function of each training data, and a leaf weight w for each training data in order to be used in boosting (here, gradient boosting) to the next decision tree. As illustrated in FIG. 13, the control unit 11 triggers the start of the above calculation by the classification module 50. The classification module 50 performs a splitting determination process for nodes in all depths (levels) for all training data and calculates a leaf weight corresponding to each training data. The classification module 50 then calculates state information (w, g, h) for the calculated leaf weight, based on label information, and writes back the calculated state information into the original address of the state memory 33. In this way, the next decision tree is learned using the updated state information.

As described above, in the learning classification device 1 according to the present embodiment, the learning module 20 includes individual memories (for example, SRAMs) for reading the feature quantities of the input sample data. With this configuration, all feature quantities of sample data can be read by single access and the process for all feature quantities can be performed at once by the gain calculation modules 21. This configuration thus can drastically speed up the decision tree learning process.

In the learning classification device 1 according to the present embodiment, the pointer memory 31 is configured with two banks: bank A and bank B, in which read and write are alternately performed. The memory thus can be used efficiently. In a simple form, the feature memory 32 and the state memory 33 may be each configured with two banks. However, data indicating an address in the feature memory 32 is typically smaller than sample data. Therefore, the memory usage can be saved by the method as in the present embodiment in which the pointer memory 31 is prepared and an address is indirectly specified. The classification module 50 writes the address of training data in order from the lower address of the write bank of two banks, when determining to split to the left of the node, and writes the address of the training data in order from the higher address of the write bank, when determining to split to the right of the node. In this manner, in the write bank, the addresses can be written separately such that the address of training data split to the left of the node is written in the lower address whereas the address of training data split to the right of the node is written in the higher address.

Modification

Figure 14:
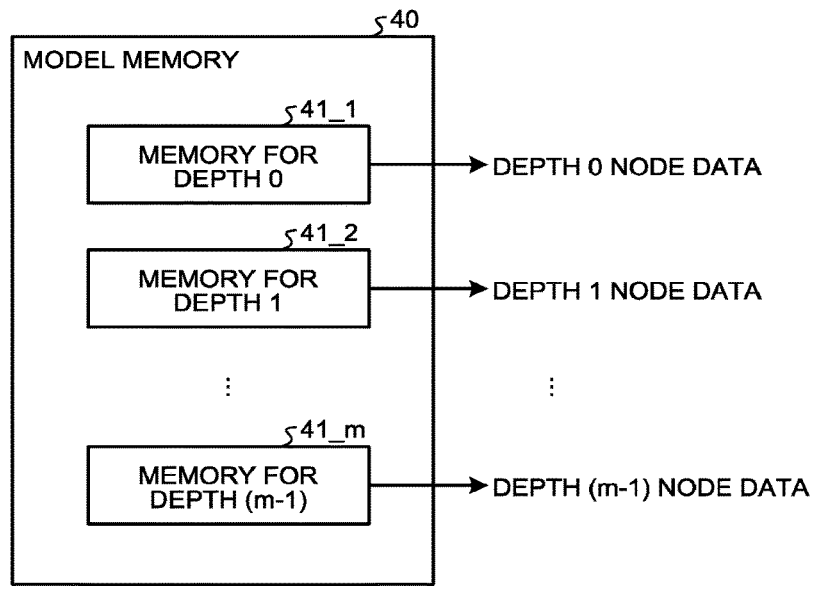
FIG. 14 is a diagram illustrating an exemplary configuration of a model memory in the learning classification device according to a modification.

FIG. 14 is a diagram illustrating an exemplary configuration of the model memory in the learning classification device according to a modification. Referring to FIG. 14, a configuration having a memory in each depth (level) of a decision tree in the model memory 40 in the learning classification device 1 according to the present modification is described.

As illustrated in FIG. 14, the model memory 40 in the learning classification device 1 according to the present modification includes a memory 41_1 for depth 0, a memory 41_2 for depth 1, . . . , a memory 41_m for depth (m−1) for storing data (specifically, branch condition data) for each depth (level) for model data of the learned decision tree. Here, m is a number equal to or greater than at least the number of depths (levels) of the decision tree model. In other words, the model memory 40 has independent ports for simultaneously retrieving data for each depth (level) (depth 0 node data, depth 1 node data, . . . , depth (m−1) node data) for the model data of the learned decision tree. Thus, the classification module 50 can read data (branch condition data) corresponding to the next node, in all the depths (levels) in parallel, based on the result of split at the initial node in a decision tree, and execute a splitting process in each depth (level) simultaneously in one clock for one piece of sample data (classification data) without going through a memory (pipeline process). Accordingly, the classification process in the classification module 50 only requires the time corresponding to a sample size, thereby drastically speeding up the classification process. By contrast, in conventional techniques, since sample data is copied into a new memory area for each node, the memory write/read time affects the speed, specifically, the classification process takes the time (sample size×number of depths (levels)). The classification process according to the present modification as described above is far superior.

Figure 15:
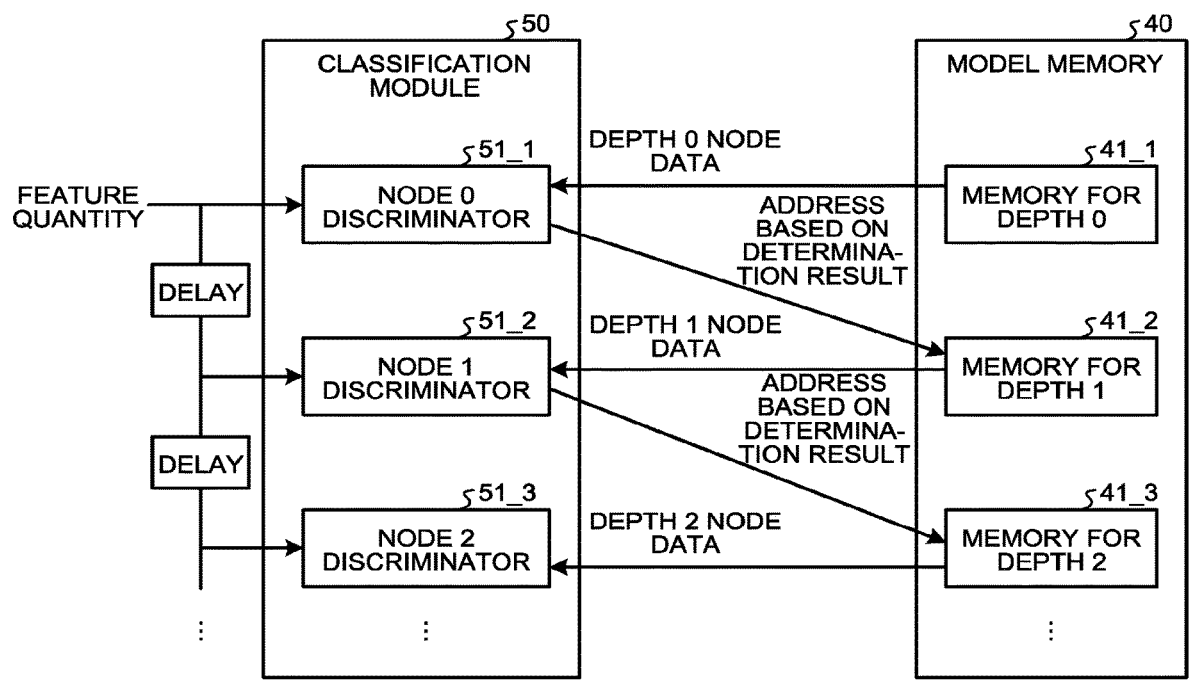
FIG. 15 is a diagram illustrating an exemplary configuration of a classification module in the learning classification device according to a modification.

FIG. 15 is a diagram illustrating an exemplary configuration of the classification module in the learning classification device according to a modification. As illustrated in FIG. 15, the classification module 50 includes a node 0 discriminator 51_1, a node 1 discriminator 51_2, a node discriminator 51_3, . . . . The feature memory 32 supplies one piece of sample data per clock as a feature quantity. As illustrated in FIG. 15, the feature quantity is first input to the node 0 discriminator 51_1. The node 0 discriminator 51_1 receives data of the node (depth 0 node data) (the condition of going to the right or to the left and the feature quantity number to be used) from the corresponding memory 41_1 for depth 0 of the model memory 40. The node 0 discriminator 51_1 determines whether the corresponding sample data goes to the right or to the left, in accordance with the condition. Here, it is assumed that the memory for each depth (memory 41_1 for depth 0, memory 41_2 for depth 1, memory 41_3 for depth 2, . . . ) has a latency of one clock. Depending on the result of the node 0 discriminator 51_1, in the next memory 41_2 for depth 1, which node to go is addressed, and data of the corresponding node (depth 1 node data) is extracted and input to the node 1 discriminator 51_2.

Since the memory 41_1 for depth 0 has a latency of one clock, the feature quantity is delayed one clock as well and input to the node 1 discriminator 51_2. The feature quantity of the next sample data is input to the node 0 discriminator 51_1 in the same clock. In this way, classification is done by a pipeline process, whereby one piece of sample data can be classified in one clock in one decision tree as a whole, assuming that data is output for each depth simultaneously. The memory 41_1 for depth 0 requires only one address since there is only one node in depth 0, and the memory 41_2 for depth 1 requires two addresses since there are two nodes in depth 1. Likewise, the memory 41_3 for depth 2 requires four addresses, and the memory for depth 3 (not illustrated) requires eight addresses. Although this classification module 50 classifies the entire tree, only the node 0 discriminator 51_1 may be used when a node is learned, whereby the circuit scale can be reduced by using the same circuit.

Examples

The prediction result of learning process speed in the learning classification device 1 according to embodiments above will be described below.

For comparison, the learning speed of XGBoost, which is a common GBDT library, and of LightGBM is evaluated. As of December 2017, the use of a GPU with LightGBM is fast, which was actually measured.

The process time was calculated from clocks of a hardware configuration. In the hardware logic implemented in this example, there are three main processes: a learning process by the learning module 20, a classification process (in units of nodes) by the classification module 50, and a classification process (in units of trees) by the classification module 50.

Process of Learning Module

Here, creation of gradient histograms from feature quantities of sample data and calculation of split scores are dominant. In creation of gradient histograms from feature quantities of sample data, it is necessary to read all sample data for each depth (level). This estimation is the maximum value because in some sample data learning is finished at a stage where the depth of a tree is shallow. The calculation of a split score refers to all bins of a gradient histogram and requires clocks by the number of bins (the dimensions of a feature quantity). Based on the above, the number of clocks $C_{learning}$ of the process by the learning module 20 is written as Eq. (23) below.

$$C_{learning} = (n_{sample\_train} * \text{maxdepth}) + (n_{feature} * n_{node}) \quad (23)$$

Here, $n_{sample\_train}$ is a sample size used for learning a decision tree, typically a set of data subsampled from all sample data. Further, maxdepth is the maximum depth of a decision tree, $n_{feature}$ is the number of bins (dimensions of a feature quantity), and $n_{node}$ is the number of nodes.

Process of Classification Module (in Units of Nodes)

Here, sample data is allocated to the lower node on either left or right, using the result of learned nodes. Since the size of sample data processed for each depth is the same, the number of clocks $C_{Classification\_node}$ is written as Eq. (24) below. In actuality, learning of some nodes is finished halfway, and the estimation below is the maximum value.

$$C_{Classification\_node} = n_{sample\_train} * \text{maxdepth} \quad (24)$$

Process of Classification Module (in Units of Trees)

Here, after learning of one decision tree is finished, the gradient information is updated for each sample data for learning of the next decision tree. For this, prediction needs to be performed for all sample data using the learned decision tree. In a process in units of trees, a delay corresponding to the depths occurs. In this case, the number of clocks $C_{Classification\_tree}$ is written as Eq. (25).

$$C_{Classification\_tree} = n_{sample\_all} + \text{maxdepth} \quad (25)$$

Here, all sample data means the sum of all training sample data and all validation sample data before subsampling.

Based on the above, the number of clocks $C_{tree}$ (maximum value) required for a learning process for one decision tree is written as Eq. (26) below.

$$C_{tree} = C_{learning} + C_{Classification\_node} + C_{Classification\_tree} \quad (26)$$

Since GBDT is configured with many decision trees, letting $n_{tree}$ be the number of decision trees, the number of clocks $C_{gbdt}$ for the entire GBDT model is written as Eq. (27).

$$C_{gbdt} = C_{tree} * n_{tree} \quad (27)$$

The above is the estimation in the case of Feature Parallel above. In Data Parallelism in which many modules are arranged in parallel and data is divided, the speed can basically be increased by a factor of the number of modules, if the number of data is balanced between nodes in each module. The degree of unbalance depends on sample data and how the sample data is divided to modules. Hereinafter, this overhead is examined using actual data. In prediction, 50% or more efficiency can be expected, even considering the overhead.

Data for Use

As test sample data, training data and classification data (evaluation data) are selected randomly from among 100,000 samples. The following is the data set overview.

Number of classes: 2
Feature quantity dimensions: 129
Training data size: 63415
Evaluation data size: 31707

The speed measuring conditions are provided in (Table 1) below. It is assumed that the clock frequency of the FPGA is 100 [MHz] in operation (actually, likely to be higher).

TABLE 1

| Explanation | Parameter |
|---|---|
| Total sample size | 95122 |
| Sample size computed | 63415 |
| Number of feature quantities | 256 |
| Maximum depth of tree | 6 |
| Number of trees in boosting | 100 |
| Data subsampling rate | 0.5 |
| Feature subsampling rate | 1 |
| Clock frequency (logic) | 100 MHz |

Estimation of Hardware Logic

The estimation of learning speed in the above architecture using the equations for calculating speed above is provided in (Table 2) below. The present estimation is premised on that all sample data is processed to the end branch and the worst values are shown.

TABLE 2

| Clock | Time [msec] | Explanation |
|---|---|---|
| 206629 | 2.07 | Time for learning in units of nodes |
| 190245 | 1.90 | Time for classification in units of nodes |
| 95128 | 0.95 | Time for classification in units of trees |
| 492002 | 4.92 | Learning time in units of trees |
| 49200200 | 492.00 | Total learning time |

Comparison Result Including Measurement in CPU/GPU

The measurement result in CPU/GPU is provided in (Table 3) below. For comparison, the estimation result of hardware logic is also provided. The estimation described above is obtained with Feature Parallel alone. For reference, the estimation result in a combination with Data Parallel is added.

TABLE 3

| Processing system | Learning speed [msec] | Ratio to fastest PC | PC |
|---|---|---|---|
| CPU (XGBoost) | 7423 | 0.15 | *1 |
| CPU (LightGBM) | 1130 | 1.00 | *1 |
| GPU (LightGBM) | 4828 | 0.23 | *2 |
| FPGA (Feature Parallel) | 492 | 2.30 | — |
| FPGA (Feature + Data Parallel) *3 | 44 | 25.84 | — |
| FPGA (Feature + Data Parallel) *4 | 4 | 275.61 | — |

*1 core i7-5930K (6C12T 3.5 GHz)
*2 GPU GTX1080Ti/CPU core i7 intel core i7 7700 (4C8T 3.6 GHz)
*3 data parallel estimated with 15-parallel data parallel efficiency of 75% (based on KC705 board)
*4 data parallel estimated with 240-parallel data parallel efficiency of 50% (based on AWS f1.16xlarge instance)

As for the present data, it is understood that the use of a GPU is slower than a CPU. According to Microsoft, the developer of LightGBM, the use of a GPU achieves a 3 to 10-fold speed-up, although it is heavily dependent on data. However, as for the present data, a speed-up by GPU is failed. This result suggests that a speed-up of GPU by the GBDT algorithm is not easier than by CNN. The result with a CPU shows that, compared with the most basic library XGBoost, the later LightGBM is about 10 times faster. Hardware logic with Feature Parallel alone is about 2.3 times faster than the fastest CPU (LightGBM) in a personal computer (PC). When 15-parallel Data Parallel is used together, with data parallel efficiency of 75%, the speed is 25 or more times faster. Considering AWS f1.16×large instance, when the efficiency in the case of 240-parallel is 50%, the speed is 275 or more times faster. However, this estimation is the case in which the memory bandwidth is the limit, and whether such logic can be fitted in an FPGA has yet to be considered.

Power consumption in an FPGA is estimated at a few [W]. Given that the power consumption in a CPU and a GPU is 100 [W] or higher, the speed plus the two-digit difference in power consumption may result in a three-digit difference in power efficiency.

An embodiment can increase the learning speed of decision trees.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A learning classification device comprising:
a data memory configured to store training data for learning a decision tree;
a learning circuitry configured to read a plurality of feature quantities included in the training data from the data memory by single access and derive data of a node based on the plurality of feature quantities, to learn the decision tree; and
a classification circuitry configured to determine where the training data read from the data memory is to be split to from the node, based on the data of the node derived by the learning circuitry,
wherein the learning circuitry includes memories corresponding to at least the number of the feature quantities of the training data, and is configured to store histograms of the feature quantities of the training data read from the data memory into the respective memories and perform a process based on the feature quantities at once, and
the learning circuitry includes:
gain calculation circuits corresponding to the number of the memories, and configured to calculate split scores for thresholds, based on the histograms of the feature quantities stored in the memories; and
a deriving circuit configured to derive a number of a feature quantity and a threshold with which a split score is optimum, as the data of the node.

2. The learning classification device according to claim 1, wherein the classification circuitry is configured to read label information of the training data together with the feature quantities of the training data from the data memory.

3. The learning classification device according to claim 1, wherein the learning circuitry is configured to learn a next decision tree by gradient boosting, based on a learning result of the learned decision tree.

4. The learning classification device according to claim 3, wherein the classification circuitry is configured to calculate a first-order gradient and a second-order gradient corresponding to an error function of each training data, and a leaf weight for the training data, and writes the calculated first-order gradient, second-order gradient, and leaf weight into the data memory in order that a next decision tree is learned by the gradient boosting by the learning circuitry.

5. The learning classification device according to claim 1, wherein the classification circuitry is configured to perform classification operation for classification data in classification while sharing a configuration for performing classification operation for the training data in learning.

6. The learning classification device according to claim 1, further comprising a model memory configured to store data of a node of the decision tree, wherein
the learning circuitry is configured to
when the node to be learned is to be further split, write flag information to that effect, as data of the node, into the model memory, and when the node to be learned is not to be further split, write flag information to that effect, as data of the node, into the model memory.

7. The learning classification device according to claim 6, wherein
the data memory is configured to store classification data to be classified using the decision tree,
the model memory includes independent ports for reading data of nodes at once for respective levels of the decision tree, and
the classification circuitry is configured to perform splitting processes for the respective levels as a pipeline process for the classification data read from the data memory, based on data of nodes at the levels simultaneously read from the ports of the model memory.

8. The learning classification device according to claim 7, wherein the classification circuitry is configured to read all feature quantities included in one piece of classification data by single access from the data memory and performs a splitting process based on the data of the node of the decision tree read from the model memory.

9. The learning classification device according to claim 7, wherein
the classification circuitry is configured to
in learning of a decision tree by the learning circuitry, perform a splitting process for each data of the node of the decision tree, for the training data read from the data memory, and
in classification for the classification data, perform the pipeline process that is splitting processes for levels for the classification data read from the data memory, based on the data of the nodes at the levels simultaneously read from the ports of the model memory.

10. The learning classification device according to claim 7, wherein
the classification circuitry includes a plurality of classification circuitry, and
each of the plurality of classification circuitry performs a splitting process for allocated classification data among a plurality of pieces of classification data stored in the data memory.

11. The learning classification device according to claim 1, wherein the learning circuitry performs learning using part of the feature quantities among all the feature quantities of the training data.

12. The learning classification device according to claim 1, wherein at least the data memory, the learning circuitry, and the classification circuitry are configured on a field-programmable gate array (FPGA).

13. The learning classification device according to claim 1, wherein the learning circuitry performs learning using part of the training data among all the training data.

14. A learning classification device comprising:
a data memory configured to store training data for learning a decision tree;
a learning circuitry configured to read a plurality of feature quantities included in the training data from the data memory by single access and derive data of a node based on the plurality of feature quantities, to learn the decision tree; and
a classification circuitry configured to determine where the training data read from the data memory is to be split to from the node, based on the data of the node derived by the learning circuitry,
wherein
the data memory includes at least two bank regions for storing addresses of the training data, the at least two bank regions are switched between a bank region for reading and a bank region for writing every time a level of a node to be learned is switched, the learning circuitry is configured to read addresses of training data split at a node from the bank region for reading and read the training data from regions of the data memory indicated by the addresses, and the classification circuitry writes addresses of the training data split at the node into the bank region for writing.

15. The learning classification device according to claim 14, wherein the classification circuitry is configured to write addresses of the training data split to one of nodes below the node into the bank region for writing, in order from a smaller address of the bank region for writing, and writes addresses of the training data split to the other node below the node into the bank region for writing, in order from a larger address of the bank region for writing.

16. A learning classification method comprising:

reading a plurality of feature quantities included in training data by single access from a data memory configured to store training data for learning a decision tree, and deriving data of a node based on the plurality of feature quantities, to learning the decision tree;

determining where the training data read from the data memory is to be split to from the node, based on the derived data of the node;

storing histograms of the feature quantities of the training data read from the data memory into the respective memories and perform a process based on the feature quantities at once;

calculating split scores for thresholds, based on the histograms of the feature quantities stored in the memories; and deriving a number of a feature quantity and a threshold with which a split score is optimum, as the data of the node.

* * * * *